(12) United States Patent
Zhou et al.

(10) Patent No.: US 9,485,714 B2
(45) Date of Patent: Nov. 1, 2016

(54) ADDRESSING MULTIPLE COMMUNICATION TERMINALS IN A WIRELESS COMMUNICATION NETWORK

(71) Applicant: Agency for Science, Technology and Research, Singapore (SG)

(72) Inventors: Yuan Zhou, Singapore (SG); Zhongding Lei, Singapore (SG); Sumei Sun, Singapore (SG); Ser Wah Oh, Singapore (SG)

(73) Assignee: Agency for Science, Technology and Research, Singapore (SG)

(*) Notice: Subject to any disclaimer, the term of this patent is extended or adjusted under 35 U.S.C. 154(b) by 30 days.

(21) Appl. No.: 14/357,416

(22) PCT Filed: Nov. 9, 2012

(86) PCT No.: PCT/SG2012/000428
§ 371 (c)(1),
(2) Date: May 9, 2014

(87) PCT Pub. No.: WO2013/070175
PCT Pub. Date: May 16, 2013

(65) Prior Publication Data
US 2014/0334368 A1 Nov. 13, 2014

(30) Foreign Application Priority Data
Nov. 9, 2011 (SG) ............................... 201108264-1

(51) Int. Cl.
*H04W 48/10* (2009.01)
*H04W 48/12* (2009.01)
(Continued)

(52) U.S. Cl.
CPC ............. *H04W 48/10* (2013.01); *H04W 4/08* (2013.01); *H04W 48/12* (2013.01); *H04W 52/0216* (2013.01); *H04W 84/12* (2013.01)

(58) Field of Classification Search
CPC ..... H04W 4/08; H04W 48/10; H04W 48/12; H04W 52/0216; H04W 68/025; H04W 84/12
See application file for complete search history.

(56) References Cited

U.S. PATENT DOCUMENTS

2006/0089138 A1* 4/2006 Smith ............... H04W 52/0229
455/426.1
2007/0291681 A1 12/2007 Jokela et al.
(Continued)

OTHER PUBLICATIONS

IEEE Computer Society, "IEEE Standard for Information technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Std 802.11-2007, 1233 pgs., (Jun. 12, 2007).
(Continued)

*Primary Examiner* — Xavier Szewai Wong
(74) *Attorney, Agent, or Firm* — Blakely, Sokoloff, Taylor & Zafman LLP

(57) ABSTRACT

The present invention is directed to a communication device of a wireless communication network, the communication device including a message generator configured to generate a beacon message having a traffic indication map (TIM) information element (IE), wherein the TIM IE includes a partial virtual bitmap field including at least one cluster; a determiner configured to determine for at least one cluster information indicating whether data is available in the communication device to be transmitted to a plurality of communication terminals of the wireless communication network; an encoder configured to determine an encoding mode for the information depending on the information and to encode the information based on the encoding mode; and a transmitter configured to broadcast the beacon message to the plurality of communication terminals corresponding to the at least one cluster. Methods of simultaneously addressing a plurality of communication terminals in the wireless communication network are also disclosed.

15 Claims, 25 Drawing Sheets

(51) Int. Cl.
  *H04W 4/08* (2009.01)
  *H04W 52/02* (2009.01)
  *H04W 84/12* (2009.01)

(56) References Cited

U.S. PATENT DOCUMENTS

| | | | |
|---|---|---|---|
| 2008/0056133 | A1 | 3/2008 | Deshpande et al. |
| 2009/0221241 | A1 | 9/2009 | Ghosh |
| 2010/0110949 | A1* | 5/2010 | Lundsgaard .......... H04W 48/16 370/311 |
| 2010/0189021 | A1 | 7/2010 | He et al. |
| 2013/0070642 | A1* | 3/2013 | Kim .................. H04W 72/0413 370/254 |
| 2014/0146678 | A1* | 5/2014 | Merlin ................ H04W 68/025 370/325 |
| 2014/0328238 | A1* | 11/2014 | Seok .................... H04W 74/04 370/311 |

OTHER PUBLICATIONS

Dwight Smith, "Device Collectives to Share Resources", IEEE 802.11-11/0779r0, 8 pgs., (May 11, 2011).
Chao-Chun Wang, et al., "Supporting Large Number of STAs in 802.11ah", IEEE 802.11-11/0725r0, 7 pgs., (May 9, 2011).
Jonghyun Park, "Station Group Management for 802.11ah", IEEE 802.11-11/0762r0, 9 pgs., (May 10, 2011).
Byeongwoo Kang, et al., "Association ID Management for TGah", IEEE 802.11-11/0088r1, 7 pgs., (Jan. 16, 2011).
Rolf De Vegt, "Potential Compromise for 802.11ah Use Case Document", IEEE 802.11-11/0457r0, 27 pgs., (Mar. 17, 2011).
PCT Notification of Transmittal of the International Search Report and the Written Opinion of the International Searching Authority, or the Declaration for PCT Counterpart Application No. PCT/SG2012/000428 Containing International Search Report, 17 pages.

* cited by examiner

| Bitmap control | Partial virtual bitmap |
|---|---|
| Bitmap control | Partial virtual bitmap |
| Bitmap control | Partial virtual bitmap |

FIG. 19

| G | Bitmap Control 1 | Length of bitmap 1 | Partial virtual bitmap 1 |
|---|---|---|---|

...

| Bitmap Control G | Length of bitmap G | Partial virtual bitmap G |
|---|---|---|

Bitmap for group 1          Bitmap for group G

FIG. 20

| Number of groups | GIM | TIM |
|---|---|---|
| e.g., M bits ≥ G | G bits | N bits |

ADDRESSING MULTIPLE COMMUNICATION TERMINALS IN A WIRELESS COMMUNICATION NETWORK

CROSS-REFERENCE TO RELATED APPLICATIONS

This patent application is a U.S. National Phase application under 35 U.S.C. §371 of International Application No. PCT/SG2012/000428, filed Nov. 9, 2012, entitled ADDRESSING MULTIPLE COMMUNICATION TERMINALS IN A WIRELESS COMMUNICATION NETWORK, which claims the benefit of priority of Singapore patent application No. 201108264-1, filed on Nov. 9, 2011, the contents of which were incorporated by reference in their entirety for all purposes.

TECHNICAL FIELD

Various embodiments generally relate to the field of addressing multiple communication terminals in a wireless communication network.

BACKGROUND

In the current IEEE 802.11 standard, an authenticated device (STA) wishing to join an infrastructure network needs to first send an Association Request to an access point (AP).

The STA is considered to be associated with the AP when an Association Response with a status code value of 'successful' is acknowledged by the STA. The association process 100 is illustrated in FIG. 1 for a STA 102 successfully associated with an AP 104.

As seen in FIG. 1, the STA 102 sends an Association Request 106 to the AP 104. In response, the AP 106 sends an Association Response including an Association ID (AID) 108 to the STA 102. Upon receiving the Association Response including the AID 108, the STA 102 sends an acknowledgement frame (ACK) 110 to the AP 104. Thus, each successfully-associated STA has an AID. At times, the STA may also need to re-associate with the AP (e.g. after AP power down). The procedure of re-association may be similar to FIG. 1. In re-association, the AP may re-assign another AID to the STA.

The IEEE 802.11 supports power-saving mode operation. A STA may go to power saving (PS) mode and only listen periodically to beacon messages to check whether there is any data buffered for it in the AP. If there is data for a STA while it is in PS mode, the AP buffers the data and informs the STA. This is achieved via the traffic indication map (TIM) information element (IE) in the beacon message. The TIM element format includes a partial virtual bitmap (or referred to as the traffic indication virtual bitmap).

The traffic indication virtual bitmap consists of a maximum of 2008 bits. Bit 1 to Bit 2007 in the traffic indication virtual bitmap corresponds to STA with AID 1 to 2007, respectively. When the bit is set to 1, it indicates that there is data buffered in the AP for the corresponding STA. When the bit is 0, it indicates that there is no data buffered in the AP for the corresponding STA. AID 0 is used to indicate broadcast/multicast, and is indicated in the Bit 0 of the bitmap control field. The partial virtual bitmap does not always need to start from AID 0. This is controlled by the offset value in bitmap control field, which indicates the starting AID of the partial virtual bitmap.

In the IEEE 802.11AH meter-to-pole use case, up to 6000 STAs per AP need to be supported. However, as described above, the current IEEE 802.11 standard is only able to address up to 2007 STAs in power-saving (PS) mode. The requirement to support about 6000 STAs mainly affects the PS STAs as there is no impact on the active STAs, since they are not addressed by AID and TIM.

To support, for example, 6000 STAs, additional information may be tagged to each device, where multiple STAs may share a single AID, and the STAs are differentiated by the additional 'Device Information' element. However, for each beacon, the group of STAs sharing a single AID is addressed together by the corresponding TIM bit, and each individual STA is not addressed separately.

The TIM definition may also be altered to support 6000 STAs. For example, rather than using all the 2007 bits as traffic indication bitmap, two bits may be used to indicate grouping. For each TIM, one group (as indicated by the two grouping bits) is addressed. The STAs belonging to the group is addressed by the remaining 2005 bits. This approach however requires the current definition of TIM to be changed, and allows addressing of only one group of STAs.

Alternatively, the STAs may be grouped based on application type or location. Each group may contain up to 2007 STAs and is assigned a unique BSSID (basic service set identification), as described below in the beacon frame format of Table 3. Different groups may be addressed by using the BSSID for each corresponding group in the beacon. The interpretation of the TIM remains the same. However, in this approach, multiple BSSIDs may be needed and each beacon may only address one particular group. Furthermore, STAs have to check every beacon in order to find its own BSSID group.

The STAs may also be assigned different beacon intervals with different offsets. Multiple STAs may be allowed to share one AID, but they are unable wake up at the same time. At each beacon, a maximum of one STA from the sets of STAs sharing one AID may wake up. However, in this approach, the AP may have to keep the states of the associated STAs in order to set the TIM correctly, the STAs may lose control of its wake up interval, and additional signaling may be needed during association to specify the wake up interval and offset for each STA.

Thus, there is a need to provide mechanisms seeking to address at least the problems above to efficiently address multiple STAs.

SUMMARY OF THE INVENTION

In a first aspect, the present invention relates a communication device of a wireless communication network. The communication device includes a message generator configured to generate a beacon message having a traffic indication map (TIM) information element (IE), wherein the TIM IE includes a partial virtual bitmap field including at least one cluster, and a bitmap control field indicating the number of clusters in the partial virtual bitmap field; a determiner configured to determine for the at least one cluster information indicating whether data is available in the communication device to be transmitted to a plurality of communication terminals of the wireless communication network; an encoder configured to determine an encoding mode for the information depending on the information and to encode the information based on the encoding mode, wherein the at least one cluster includes the encoded information and indicates the encoding mode; and a transmitter configured to broadcast the beacon message to the plurality of communication terminals corresponding to the at least one cluster.

According to a second aspect, the present invention relates to a communication terminal of a wireless communication network. The communication terminal includes a receiver configured to receive from a communication device of the wireless communication network a beacon message having a traffic indication map (TIM) information element (IE), wherein the TIM IE includes a partial virtual bitmap field including at least one cluster, and a bitmap control field indicating the number of clusters in the partial virtual bitmap field, and wherein the at least one cluster includes an encoded information and indicates an encoding mode; a decoder configured to decode the encoded information based on the encoding mode; a determiner configured to determine based on the information whether the communication terminal is to retrieve data from the communication device, wherein the beacon message is for a group of communication terminals; and wherein the communication terminal is part of the group.

In a third aspect, the present invention relates to a method of simultaneously addressing a plurality of communication terminals of a wireless communication network. The method includes generating a beacon message having a traffic indication map (TIM) information element (IE), wherein the TIM IE includes a partial virtual bitmap field including at least one cluster, and a bitmap control field indicating the number of clusters in the partial virtual bitmap field; determining for the at least one cluster information indicating whether data is available in a communication device to be transmitted to the plurality of communication terminals of the wireless communication network; determining an encoding mode for the information depending on the information and encoding the information based on the encoding mode, wherein the at least one cluster includes the encoded information and indicates the encoding mode; and broadcasting the beacon message to the plurality of communication terminals corresponding to the at least one cluster.

In a fourth aspect, the present invention relates to a method of simultaneously addressing a plurality of communication terminals of a wireless communication network. The method includes receiving from a communication device of the wireless communication network a beacon message having a traffic indication map (TIM) information element (IE), wherein the TIM IE includes a partial virtual bitmap field including at least one cluster, and a bitmap control field indicating the number of clusters in the partial virtual bitmap field, and wherein the at least one cluster includes an encoded information and indicates an encoding mode; decoding the encoded information based on the encoding mode; determining based on the information whether the communication terminal is to retrieve data from the communication device, wherein the beacon message is for a group of communication terminals; and wherein the communication terminal is part of the group.

In a fifth aspect, the present invention relates to a communication device of a wireless communication network, the communication device including a grouping determiner configured to divide a plurality of communication terminals of the wireless communication network into groups based on geographical location; a determiner configured to determine, for a first buffered data to be sent to a first communication terminal of the plurality of communication terminals and for a second buffered data to be sent to a second communication terminal of the plurality of communication terminals, a first group to which the first communication terminal belongs and a second group to which the second communication terminal belongs; a message generator configured to generate a first message and a second message, wherein each of the first message and the second message includes information respectively indicating that the first buffered data and the second buffered data are to be sent from the communication device; and a transmitter configured to transmit the first message to, the communication terminals of the first group and the second message to the communication terminals of the second group at least partially at the same time.

In a sixth aspect, the present invention relates to a method of simultaneously addressing a plurality of communication terminals of a wireless communication network, the method including dividing a plurality of communication terminals of the wireless communication network into groups based on geographical location; determining, for a first buffered data to be sent to a first communication terminal of the plurality of communication terminals and for a second buffered data to be sent to a second communication terminal of the plurality of communication terminals, a first group to which the first communication terminal belongs and a second group to which the second communication terminal belongs; generating a first message and a second message, wherein each of the first message and the second message includes information respectively indicating that the first buffered data and the second buffered data are to be sent from the communication device; and transmitting the first message to the communication terminals of the first group and the second message to the communication terminals of the second group at least partially at the same time.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features/elements may be arbitrarily expanded or reduced for clarity. In the following description, various embodiments of the invention are described with reference to the following drawings, in which:

FIG. 19 shows an exemplary frame format using three TIM IEs for dynamic addressing, in accordance to various embodiments;

FIG. 20 shows an exemplary frame format of encoding G groups into a single TIM, in accordance to various embodiments;

FIG. 21 shows an exemplary frame format of TIM encoding with ambiguity, in accordance to various embodiments;

DETAILED DESCRIPTION

Figure 1:
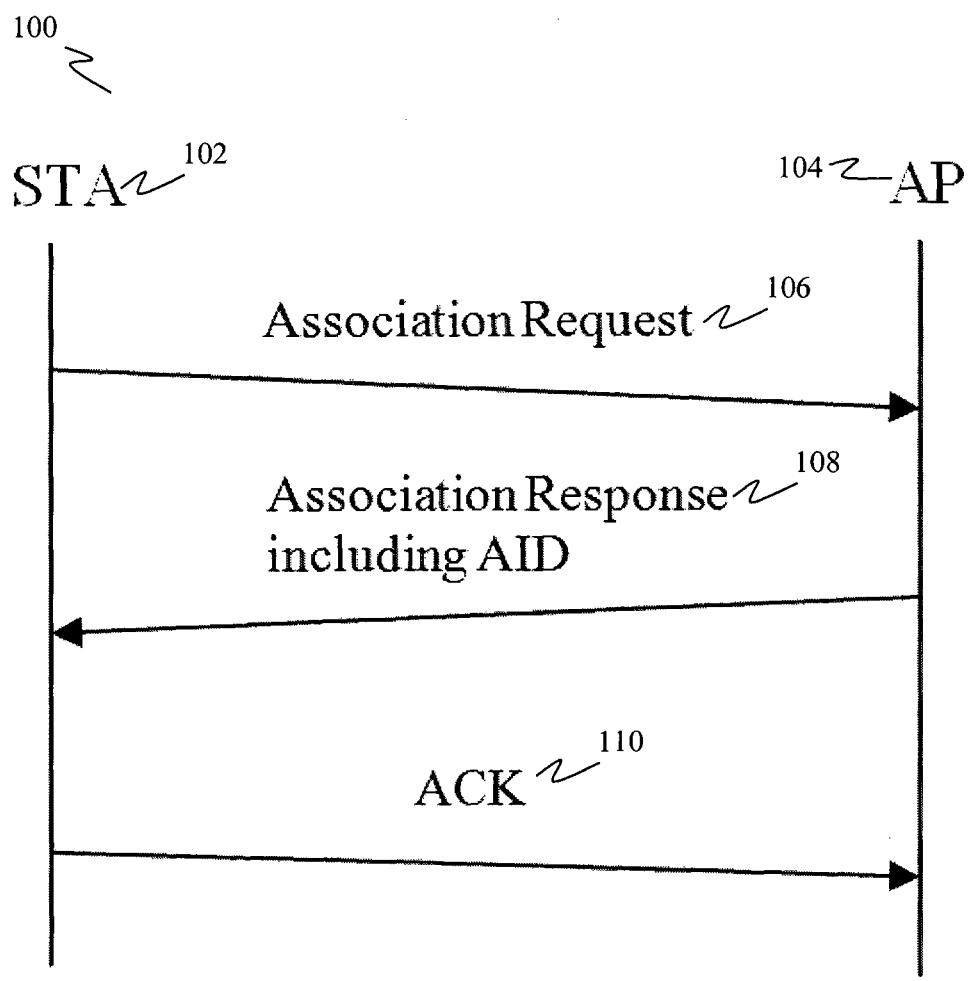
FIG. 1 shows a schematic diagram of an association process.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

Various embodiments may provide methods of addressing multiple devices in a wireless communication system.

Various embodiments may provide methods of addressing efficiently a number of arbitrary devices, methods of addressing efficiently a number of arbitrary devices within a group of devices, and methods of grouping and addressing devices geographically and spatially in a wireless communication system, for example, a wireless local area network communication (WLAN) standard.

In addressing an authenticated device (STA) in a wireless communication system or network, various embodiments may provide the STA to first send an Association Request to an access point (AP). The frame format of the Association Request is shown in Table 1.

TABLE 1

| Order | Information | Notes |
|---|---|---|
| 1 | Capability | |
| 2 | Listen interval | |
| 3 | SSID | |
| 4 | Supported rates | |
| 5 | Extended Supported Rates | The Extended Supported Rates element is present whenever there are more than eight supported rates, and it is optional otherwise. |
| 6 | Power Capability | The Power Capability element shall be present if dot11SpectrumManagementRequired is true. |
| 7 | Supported Channels | The Supported Channels element shall be present if dot11SpectrumManagementRequired is true. |
| 8 | RSN | The RSN information element is only present within Association Request frames generated by STAs that have dot11RSNAEnabled set to TRUE. |
| 9 | QoS Capability | The QoS Capability element is present when dot11QosOption-Implemented is true. |
| Last | Vendor Specific | One or more vendor-specific information elements may appear in this frame. This information element follows all other information elements. |

From Table 1, it is shown that the frame format of the Association Request includes the following information in a predefined order: capability, listen interval, Service Set Identifier (SSID), supported rates, extended supported rates, power capability, supported channels, Robust Security Network (RSN), Quality of Service (QoS) capability, and vendor specific.

Upon reception of the authenticated STA's Association Request, the AP replies an Association Response with a status code to the STA. The format of the Association Response is shown in Table 2.

TABLE 2

| Order | Information | Notes |
| --- | --- | --- |
| 1 | Capability | |
| 2 | Status code | |
| 3 | AID | |
| 4 | Supported rates | |
| 5 | Extended Supported Rates | The Extended Supported Rates element is present whenever there are more than eight supported rates, and it is optional otherwise. |
| 6 | EDCA Parameter Set | |
| Last | Vendor Specific | One or more vendor-specific information elements may appear in this frame. This information element follows all other information elements. |

From Table 2, it is shown that the frame format of the Association Response includes the following information in a predefined order: capability, status code, Association ID (AID), supported rates, extended supported rates, Enhanced Distributed Channel Access (EDCA) parameter set, and vendor specific.

If the status code value is 'successful', the AP also assigns an AID to the STA and includes AID in the Association Response.

Various embodiments may provide in the IEEE 802.11 channel access, two mechanisms: contention based mechanism and contention-free channel access, also known as distributed coordination function (DCF) and point coordination function (PCF), respectively. The DCF is basically a carrier sense multiple access with collision avoidance (CSMA/CA) mechanism, and it is the fundamental channel access method upon which PCF is built. DCF is implemented in all STAs, and it works as described below.

Figure 2:
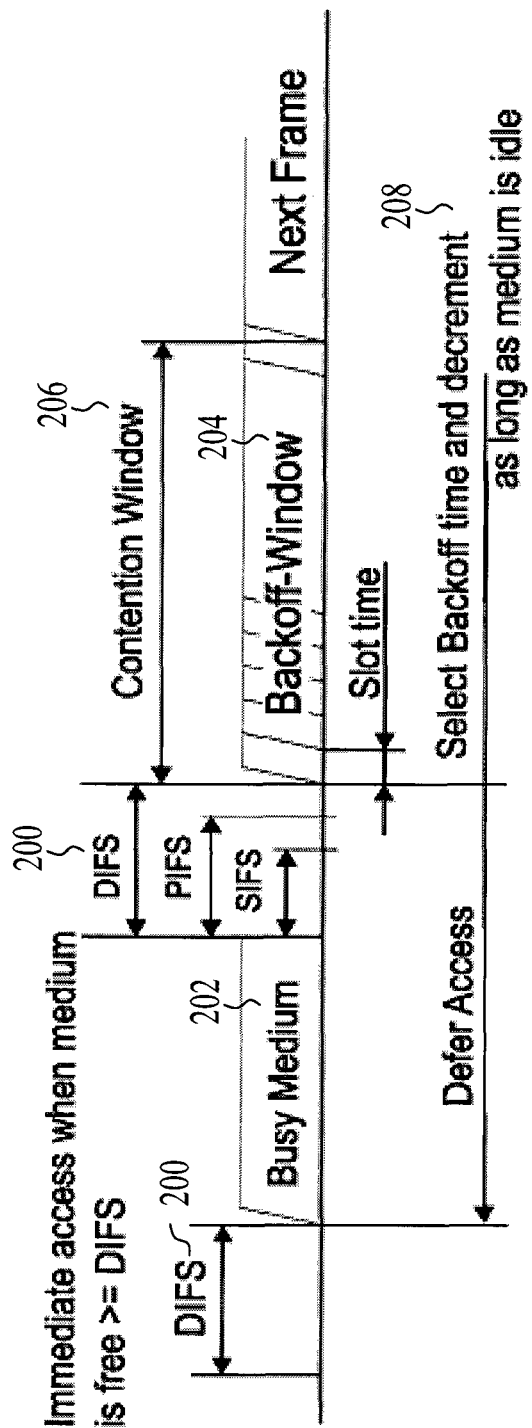
FIG. 2 shows a schematic diagram illustrating the events in a CSMA/CA channel access method.

As shown in FIG. 2, a STA wishing to use the channel for new data transmission first senses the channel for a certain period of time called the Distributed Inter-Frame Spacing (DIFS) 200. If the channel is free for greater than DIFS 200, the STA may use the channel. If the channel is busy 202 during the DIFS 200, the STA enters back-off 204 by selecting uniformly a random number from a Contention Window (CW) 206. The STA maintains a back-off counter. Every time the STA senses that the channel is free for DIFS 200, the STA decreases the back-off counter 208.

Figure 3:
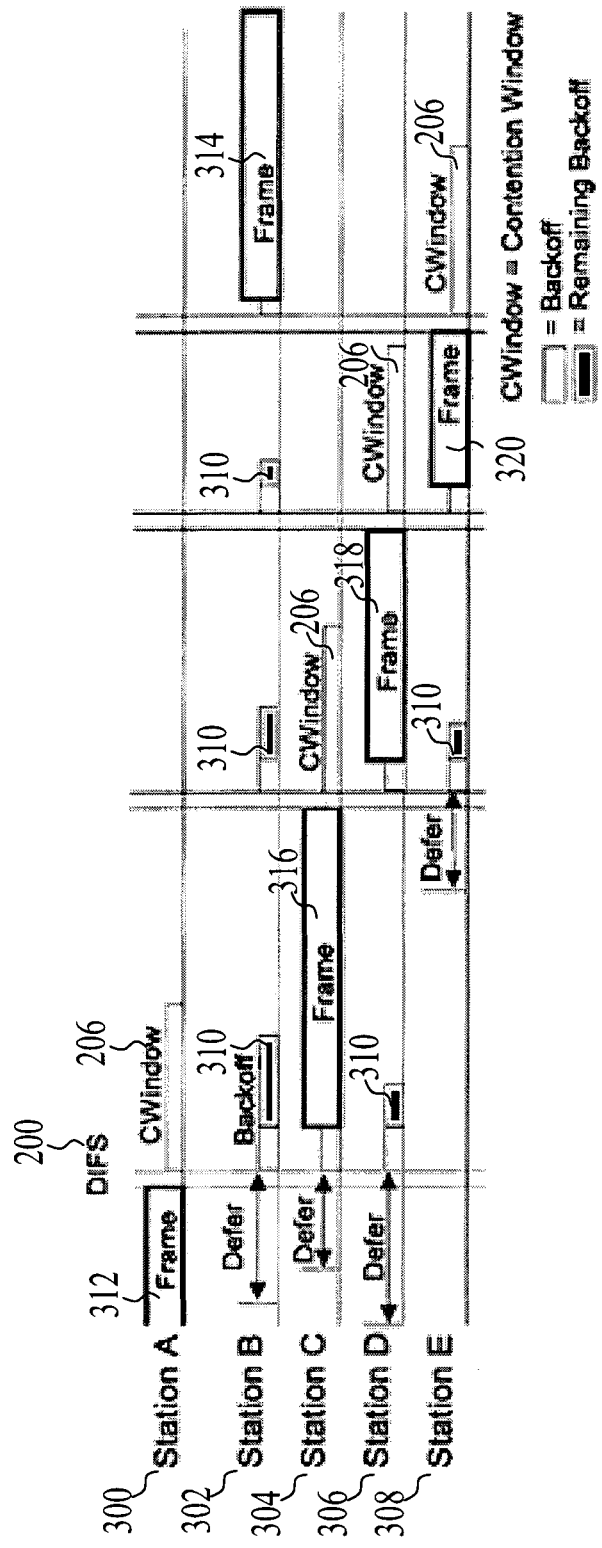
FIG. 3 shows a schematic diagram illustrating the events in a back-off procedure.

When the channel is busy, the STA (e.g., Station A 300, Station B 302, Station C 304, Station D 306, Station E 308) freezes the back-off counter 310, as shown in FIG. 3. When the (respective) back-off counter reaches zero, the STA (e.g., Station A 300, Station B 302, Station C 304, Station D 306, Station E 308) transmits the packet (e.g., Frame 312 for Station A 300, Frame 314 for Station B 302, Frame 316 for Station C 304, Frame 318 for Station D 306, Frame 320 for Station E 308). If an ACK to the packet is received, the data transmission is successful. After a successful transmission, the STA sets the CW 206 to its minimum (CWmin). If the STA does not receive the ACK, transmission failure has occurred, and the STA doubles its CW size and enters a new back-off. The CW size stays unchanged once its maximum (CWmax) is reached.

Figure 4:
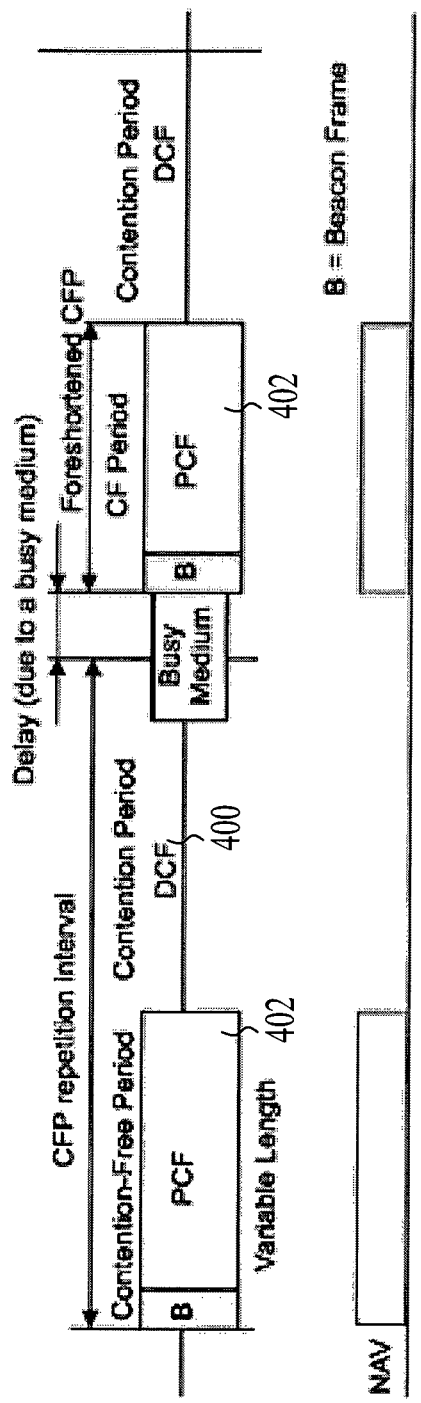
FIG. 4 shows a schematic diagram illustrating the events for coexistence of DCF and PCF.

Various embodiments may provide the PCF being implemented optionally by the IEEE 802.11 MAC in infrastructure mode. Once AP wins the channel, it may start the PCF process, where it polls eligible STAs for uplink data and transmits downlink data. DCF 400 and PCF 402 may alternate with each other and coexist, as shown in FIG. 4.

Various embodiments may provide a communication device (e.g., an access point) to send a message (e.g., a beacon message) to communication terminals (e.g., mobile stations or STAs) of a wireless communication network in order to establish an association with the communication terminals. The message may be encoded to represent different mechanisms for the association process. Each of these mechanisms may be more efficient or more effective for different (or specific) scenarios in the wireless communication network.

In various embodiments, the communication device may associate with multiple communication terminals, which are divided into groups. The communication device may address these communication terminals separately with the aid of information about the group in which they belong.

Figure 5:
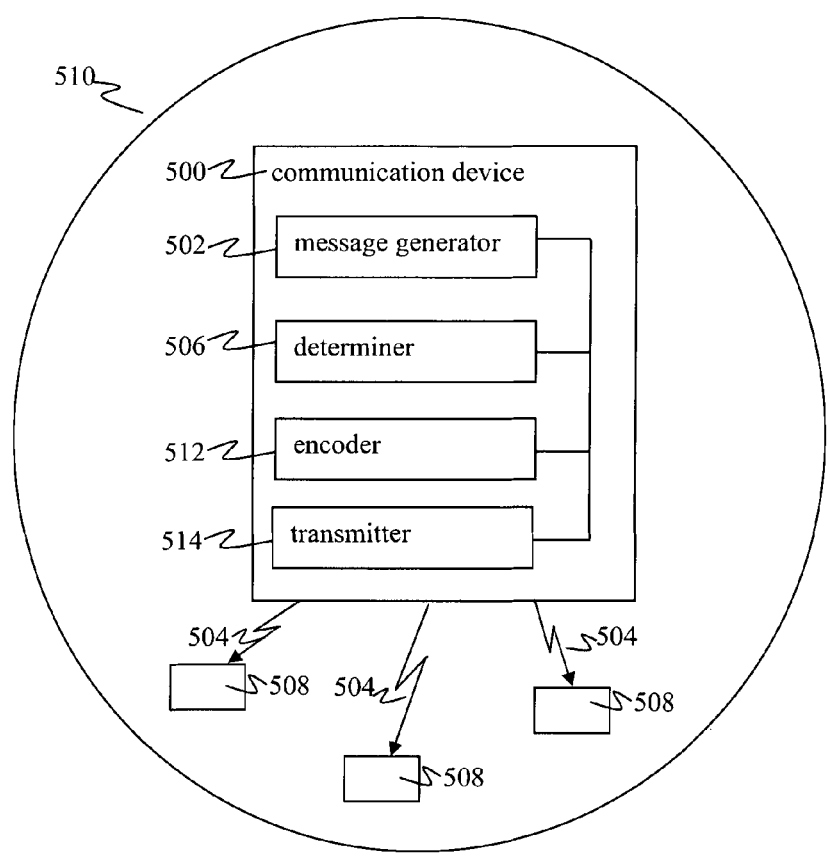
FIG. 5 shows a schematic diagram of a communication device, in accordance to various embodiments.

In a first aspect, a communication device of a wireless communication network is provided as shown in FIG. 5. In FIG. 5, the communication device 500 includes a message generator 502 configured to generate a beacon message 504 having a traffic indication map (TIM) information element (IE), wherein the TIM IE includes a partial virtual bitmap field including at least one cluster, and a bitmap control field indicating the number of clusters in the partial virtual bitmap field; a determiner 506 configured to determine for the at least one cluster information indicating whether data is available in the communication device 500 to be transmitted to a plurality of communication terminals 508 of the wireless communication network 510; an encoder 512 configured to determine an encoding mode for the information depending on the information and to encode the information based on the encoding mode, wherein the at least one cluster includes the encoded information and indicates the encoding mode; and a transmitter 514 configured to broadcast the beacon message 504 to the plurality of communication terminals 508 corresponding to the at least one cluster.

As used herein, the term "communication device" may to a node of a network, which communicates directly with a communication terminal. A communication device 500 may be, for example but not limited to, a base station, or a substation, or an access point, or a modem, a cable, or a port.

In one embodiment, the communication device 500 may include an access point (AP).

In the context of various embodiments, the term "communication terminal" may refer to a machine that assists data transmission, that is sending and/or receiving data information. Accordingly, the communication terminal may also be generally referred to as a node. For example, a communication terminal may be but is not limited to, a station (STA), or a substation, or a mobile station (MS), or a port, or a mobile phone, or a computer, or a laptop.

In one embodiment, the communication terminal 508 may include a mobile device or a station.

As used herein, the term "determine" may refer to "evaluate", "compute", "obtain", or "check".

In the context of various embodiments, the term "clusters" may refer to groups, or collections. The term "correspond to" may refer to "associate with", or "form".

In various embodiments, the term "wireless communication network" may be a communication network according to a IEEE 802.11 communication standard. For example, the wireless communication network 510 may be a WiFi network.

In various embodiments, the partial virtual bitmap may be a partial virtual bitmap indicating communication terminals having buffered data. The bitmap control field may have a predefined length The beacon message 504 may be, for example, in an infrastructure basic service set (BSS), periodically being generated by the AP. The IEEE 802.11 beacon frame format is shown in Table 3.

TABLE 3

| Order | Information | Notes |
|---|---|---|
| 1 | Timestamp | |
| 2 | Beacon interval | |
| 3 | Capability | |
| 4 | Service Set Identifier (SSID) | |
| 5 | Supported rates | |
| 6 | Frequency-Hopping (FH) Parameter Set | The FH Parameter Set information element is present within Beacon frames generated by STAs using FH PHYs. |
| 7 | DS Parameter Set | The DS Parameter Set information element is present within Beacon frames generated by STAs using Clause 15, Clause 18, and Clause 19 PHYs. |
| 8 | CF Parameter Set | The CF Parameter Set information element is present only within Beacon frames generated by APs supporting a PCF. |
| 9 | IBSS Parameter Set | The IBSS Parameter Set information element is present only within Beacon frames generated by STAs in an IBSS. |
| 10 | Traffic indication map (TIM) | The TIM information element is present only within Beacon frames generated by APs. |
| 11 | Country | The Country information element shall be present when dot11MultiDomainCapabilityEnabled is true or dot11SpectrumManagementRequired is true. |
| 12 | FH Parameters | FH Parameters as specified in 7.3.2.10 may be included if dot11MultiDomainCapabilityEnabled is true. |
| 13 | FH Pattern Table | FH Pattern Table information as specified in 7.3.2.11 may be included if dot11MultiDomainCapabilityEnabled is true. |
| 14 | Power Constraint | Power Constraint element shall be present if dot11SpectrumManagementRequired is true. |
| 15 | Channel Switch Announcement | Channel Switch Announcement element may be present if dot11SpectrumManagementRequired is true.. |
| 16 | Quiet | Quiet element may be present if dot11SpectrumManagementRequired is true. |
| 17 | IBSS DFS | IBSS DFS element shall be present if dot11SpectrumManagementRequired is true in an IBSS. |
| 18 | TPC Report | TPC Report element shall be present if dot11SpectrumManagementRequired is true. |
| 19 | ERP Information | The ERP Information element is present within Beacon frames generated by STAs using extended rate PHYs (ERPs) defined in Clause 19 and is optionally present in other cases. |
| 20 | Extended Supported Rates | The Extended Supported Rates element is present whenever there are more than eight supported rates, and it is optional otherwise. |
| 21 | RSN | The RSN information element shall be present within Beacon frames generated by STAs that have dot11RSNAEnabled set to TRUE. |
| 22 | BSS Load | The BSS Load element is present when dot11QosOption-Implemented and dot11QBSSLoadImplemented are both true. |
| 23 | EDCA Parameter Set | The EDCA Parameter Set element is present when dot11QosOptionImplemented is true and the QoS Capability element is not present. |
| 24 | QoS Capability | The QoS Capability element is present when dot11QosOption-Implemented is true and EDCA Parameter Set element is not present. |
| Last | Vendor Specific | One or more vendor-specific information elements may appear in this frame. This information element follows all other information elements. |

The TIM IE is indicated in order 10 of Table 3.

In various embodiments, the information may indicate for each communication terminal of the plurality of communication terminals 508, whether data is available in the communication device 500 to be transmitted to the communication terminal 508.

The encoding mode may have a bit length of at least one bit. The number of way in which the information may be encoded depends on the number of bits of the encoding mode. For example, the encoding mode may have a bit length of 1 bit, 2 bits, 3 bits or n bits. With the 1-bit encoding mode, the information may be encoded in two different ways. With the 2-bit encoding mode, the information may be encoded in four different ways, and so on. Thus, with the n-bit encoding mode, the information may be encoded in $2^n$ different ways.

In various embodiments, the encoder 512 may be configured to determine the encoding mode based on the number of bits in the information that is set, or a distribution of the bits in the information that is set, or the number of communication terminals that the communication device intends to address, or the complexity level of decoding the encoding mode, or any combination thereof. For example, the encoder 512 may be configured to determine the encoding mode based on the number of bits in the information that is set and/or the distribution of the bits in the information that is set.

The encoded information may include a plurality of association identities (AIDs), by each of which a communication terminal of the plurality of communication terminals 508 is identified.

In various embodiments, the communication device may further include a grouping determiner configured to divide the plurality of communication terminals 508 of the wireless communication network 510 into groups.

The term "groups" may interchangably be referred to as "sets". It should be appreciated that the "groups" may also refer to "subgroups" when "clusters" are referred to as "groups".

The term "divide" may be "determine", "categorize", "group", "assign", or "allocate".

In various embodiments, the transmitter 514, when broadcasting the beacon message 504 to the plurality of communication terminals 508 corresponding to the at least one cluster may be configured to broadcast the beacon message 504 to the communication terminals 508 of at least one of the groups.

Figure 6:
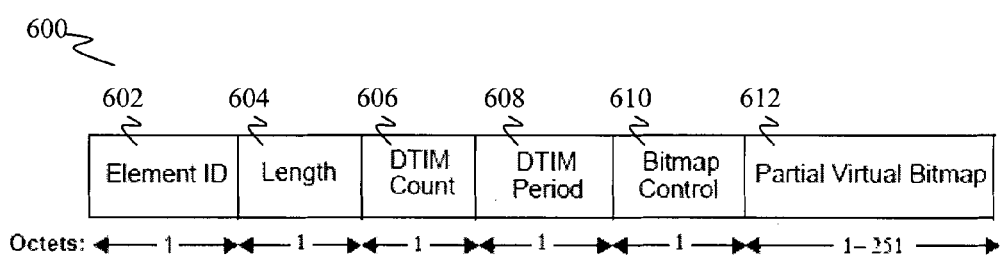
FIG. 6 shows a TIM IE frame format, in accordance to various embodiments.

In various embodiments, the encoded information may include a first bitmap. For example, the first bitmap may be a traffic indication map (TIM). The TIM may be included in or may be part of the TIM information element (at order 10 of Table 3). The TIM element format is shown in FIG. 6. The TIM element format 600 includes 1-octet element ID 602, 1-octet length 604, 1-octet delivery traffic indication message (DTIM) count 606, 1-octet DTIM period 608, 1-octet bitmap control 610, and 1-octet to 251-octet partial virtual bitmap 612. The TIM is controlled by the AP.

In one embodiment, the encoded information may further include a first control field for the first bitmap. For example, the first control field may refer to the bitmap control 610 of FIG. 6.

Figure 7:
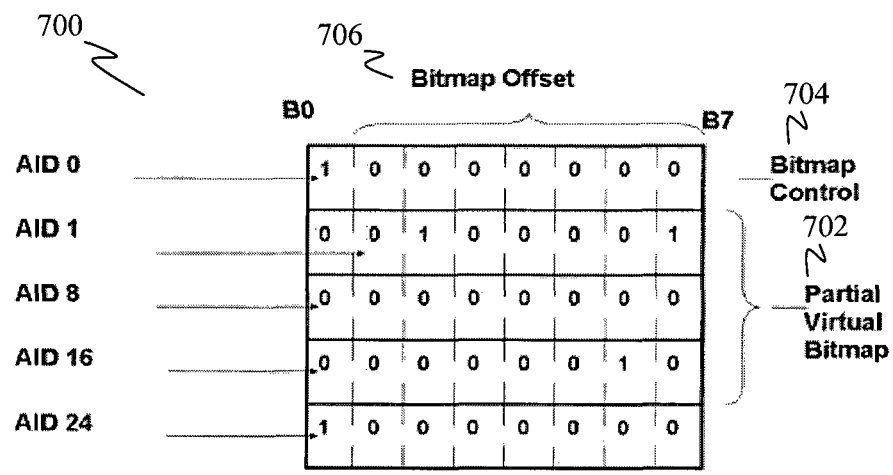
FIG. 7 shows an example of TIM encoding, in accordance to various embodiments.

An example of encoding a TIM virtual bitmap 700 is shown in FIG. 7, where STAs with AID 2, 7, 22, and 24 have data buffered in the AP as the bits in AID 2, 7, 22, and 24 are set (to "1"). For example, AID 1 to AID 23 indicate partial virtual bitmap 702. B0 to B7 indicate bitmap control 704. B0 of the bitmap control field (AID 0) is also set to indicate group-addressed data packet. Bits B1 to B7 in the bitmap control field determine the bitmap offset 706.

The first control field may further include an offset value for the bitmap.

Figure 8:
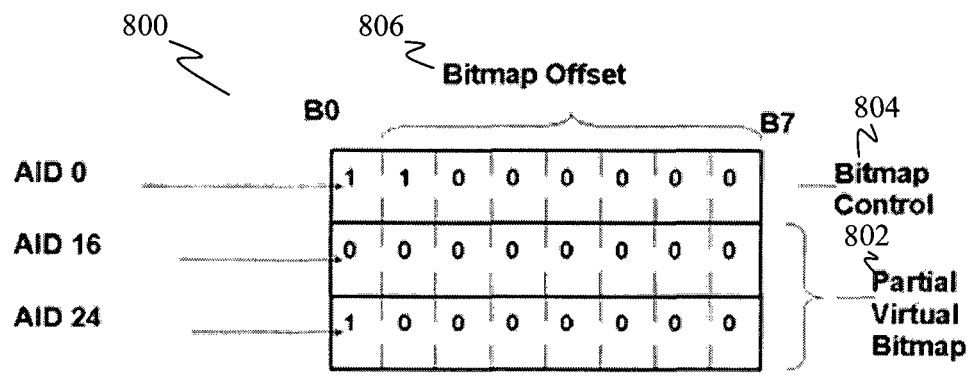
FIG. 8 shows another example of TIM encoding with offset, in accordance to various embodiments.

Another example of a virtual bitmap 800 with offset is shown in FIG. 8, where the bitmap offset 806 of the bitmap control 804 has an offset value of 1, corresponding to AID offset of 16 of the partial virtual bitmap 802.

In some embodiments, the encoded information may further include information about the group corresponding to a group identity (GID).

For example, the encoded information may include a first part indicative of a number of groups (G) of communication terminals of the wireless communication network 510; and a second part including G segments, each segment including a second bitmap and a second control field for the second bitmap; and being associated to a group identity (GID), wherein the information about the group corresponds to the first part and the second control field of the second part; and wherein the first bitmap corresponds to the second bitmap of the second part.

For the segment of the second part, the second control field may include an offset value for the second bitmap.

In some embodiments, the segment of the second part may further include a length field indicative of the number of bits of the segment.

In one embodiment, the GID may be determined based on a mathematical formulation of an association identity (AID) of a communication terminal of a group from the groups of communication terminals 508 and the number of communication terminals (N) in the group, as given by Modulus(AID of the communication terminal/$N$).

In a different embodiment, an address of a bit in the first bitmap may be determined based on a mathematical formulation of an association identity (AID) of a communication terminal of a group from the groups of communication terminals 508 and the number of communication terminals (N) in the group, as given by Remainder(AID of the communication terminal/$N$).

As used herein, the "address of a bit in the first bitmap" may be interchangably referred to as the bit position in the first bitmap or the relative index of the bit in the first bitmap.

In these embodiments, the second bitmap may be coded by representing the AID directly in binary bits with a predefined length.

In another embodiment, the GID may be determined based on a mathematical function of a Time Synchronization Function (TSF) of a communication terminal of a group from the groups of communication terminals 508, a beacon interval (BI) of the beacon message, and the number of groups (G) of communication terminals, as given by Remainder(Modulus(TSF,BI)/$G$).

In various embodiments, the second bitmap may be inversely coded depending on the second control field.

The first bitmap may be inversely coded depending on the first control field.

As used herein, the term "inversely coded" refers to setting each bit of the at least part of the TIM that is initially "0" to "1" and resetting each bit of the at least part of the TIM that is initially "1" to "0". For example, "01010110" is inversely coded to give "10101001".

The first control field or the second control field may further include a sign bit configured to set to a first state indicating that the first bitmap or the second bitmap is coded (i.e., not inversely coded) or to a second state indicating that the first bitmap or the second bitmap is inversely coded, the first state being different from the second state.

In one example, when the sign bit is "1", the first bitmap or the second bitmap shows bits which has been inversely coded (i.e., inverse coding being performed). When the sign bit is "0", no inverse coding is performed on the first bitmap or the second bitmap.

In various embodiments, the information about the group may include a part indicative of a number of groups (G) of communication devices of the wireless communication network 510; and a group indicator map (GIM) field with G bits, each of the G bits corresponding to a group of communication terminals from the groups of communication terminals; and wherein the first bitmap is arranged to be decoded by the group of communication terminals depending on a state of the corresponding bit in the GIM field.

The GIM field may include a third bitmap associating each of the groups of communication terminals to a group identity (GID). For example, an $n^{th}$ bit position of the third bitmap may indicate whether there is any communication terminal in the $n^{th}$ group having buffered data.

Figure 9:
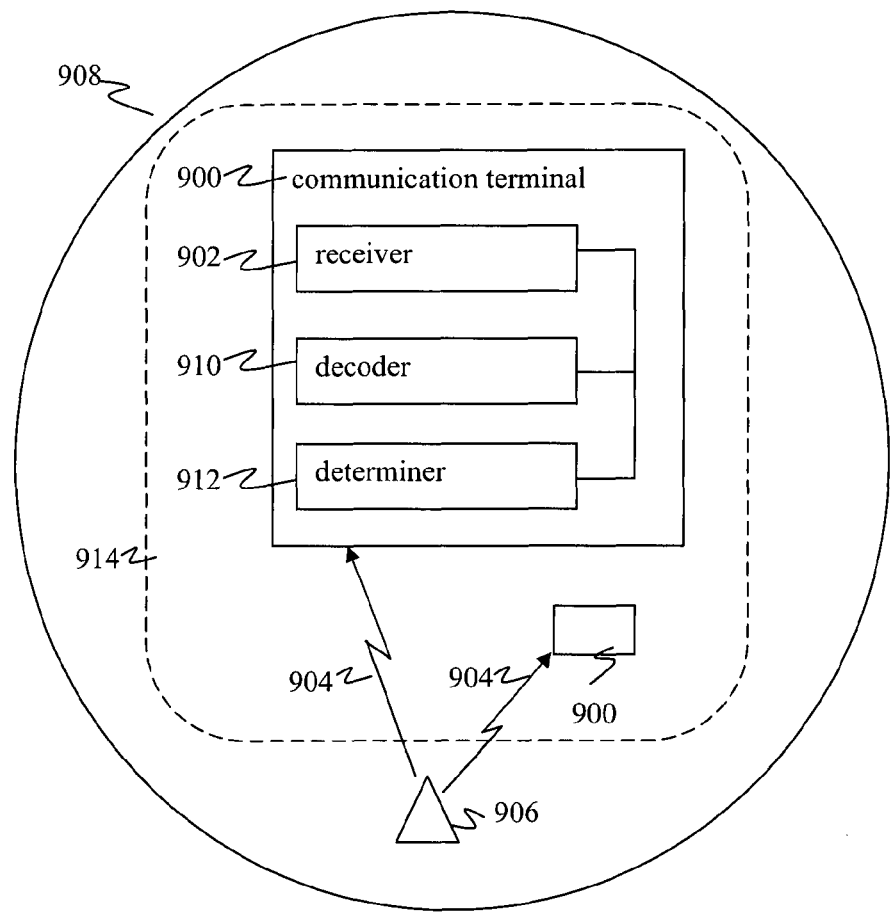
FIG. 9 shows a schematic diagram of a communication terminal, in accordance to various embodiments.

In a second aspect, a communication terminal of a wireless communication network is provided as shown in FIG. 9. In FIG. 9, the communication terminal 900 includes a receiver 902 configured to receive from a communication device 906 of the wireless communication network 908 a beacon message 904 having a traffic indication map (TIM) information element (IE), wherein the TIM IE includes a partial virtual bitmap field including at least one cluster, and a bitmap control field indicating the number of clusters in the partial virtual bitmap field, and wherein the at least one cluster includes an encoded information and indicates an encoding mode; a decoder 910 configured to decode the encoded information based on the encoding mode; a determiner 912 configured to determine based on the information whether the communication terminal 900 is to retrieve data from the communication device 906, wherein the beacon message 904 is for a group of communication terminals 914; and wherein the communication terminal 900 is part of the group 914.

The terms "communication terminal", "communication device", "beacon message", "wireless communication network", "determine", "group", "information", "encoded information", "encoding mode" may be as defined above.

For example, the communication terminal 900, the communication device 906, and the beacon message 904 may be the communication terminal 508, the communication device 500, and the beacon message 504 of FIG. 5.

In various embodiments, the communication terminal 900 may be identified by an association identity (AID) of the wireless communication network 908.

In various embodiments, the communication terminal 900 may have a group identity (GID) for use in identifying the group of communication terminals 914 of the wireless communication network 908 to which the communication terminal 900 belongs.

The terms "AID" and "GID" may be defined as above.

In one embodiment, the decoded information may include a plurality of association identities (AIDs), by each of which a communication terminal (for example, the communication terminal 900) is identified in the wireless communication network 908; and the determiner 912 may be configured to determine that the communication terminal 900 is to retrieve a buffered data from the communication device (or be in an active mode) if the AID of the communication terminal 900 matches one of the plurality of AIDs of the decoded information; or to determine that the communication terminal 900 is to be in a power saving mode if the AID of the communication terminal 900 fails to match any of the plurality of AIDs of the decoded information.

In a different embodiment, the decoded information may include a first bitmap; and information about the group corresponding to a group identity (GID); and the determiner 912 may be configured to determine that the communication terminal 900 is to retrieve a buffered data from the communication device (or be in an active mode) if the GID and the AID of the communication terminal 900 respectively match the information about the group and an address of the first bitmap; or to determine that the communication terminal 900 is to be in a power saving mode if at least one of the GID and the AID of the communication terminal 900 fails to match the information about the group and any address of the first bitmap respectively.

As used herein, the term "match" may interchangably be referred to as "correspond to", "equal to", or "to be the same as".

The term "first bitmap" may be defined as above.

In the context of various embodiments, the term "address" of the first bitmap (e.g., TIM) similarly refers to the "address of a bit in the first bitmap" as defined above. For example, the address of the TIM may be any one of AID 1 to AID 31 as described in FIG. 7.

In another embodiment, the decoded information may include a first part indicative of a number of groups (G) of communication terminals of the wireless communication network 908; and a second part including G segments, each segment including a second bitmap and a second control field for the second bitmap; and being associated to a group identity (GID), wherein the information about the group 914 corresponds to the first part and the second control field of the second part; and wherein the first bitmap corresponds to the second bitmap of the second part; and the determiner 912 may be configured to determine that the communication terminal 900 is to retrieve the buffered data from the communication device (or be in the active mode) if the GID and the AID of the communication terminal 900 respectively match the GID and a bitmap address of the segment; or to determine that the communication terminal 900 is to be in the power saving mode if at least one of the GID and the AID of the communication terminal 900 fails to match the GID and any bitmap address of the segment respectively.

The terms "second bitmap", "segment", and "control field" may be defined as above.

In yet another embodiment, the information about the group 914 may include a part indicative of a number of groups (G) of communication terminals of the wireless communication network 908; and a group indicator map (GIM) field with G bits, each of the G bits corresponding to a group of communication terminals 914 from the groups of communication terminals; wherein the first bitmap is arranged to be decoded by the group of communication terminals 914 depending on a state of the corresponding bit in the GIM field, the GIM field including a third bitmap associating each of the groups of communication terminals to a group identity (GID); and the determiner 912 may be configured to determine that the communication terminal 900 is to retrieve the buffered data from the communication device (or be in the active mode) if the GID and the AID of the communication terminal 900 respectively match the GID and an address of the first bitmap; or to determine that the communication terminal 900 is to be in the power saving mode if at least one of the GID and the AID of the communication terminal 900 fails to match the GID and any address of the first bitmap respectively.

The term "GIM" is defined as above.

In various embodiments, the communication terminal 900 may further include a transmitter configured to send a power saving poll message to the communication device 906 when the communication terminal 900 is determined to retrieve the buffered data from the communication device (or be in the active mode) and the communication terminal 900 may be further configured to receive the buffered data from the communication device 906.

In some examples, the receiver 902 and the transmitter of the communication terminal 900 may be combined into a single package, referred to as a transceiver. In general, a transceiver includes both transmitting and receiving capabilities and functions.

For example, from the beacon message received, a STA is able to determine whether the AP has buffered data for it. If the corresponding TIM bit is set, the STA may send a power-saving poll (PS-Poll) message to the AP. The format of the PS-Poll is shown in FIG. 10.

Figure 10:
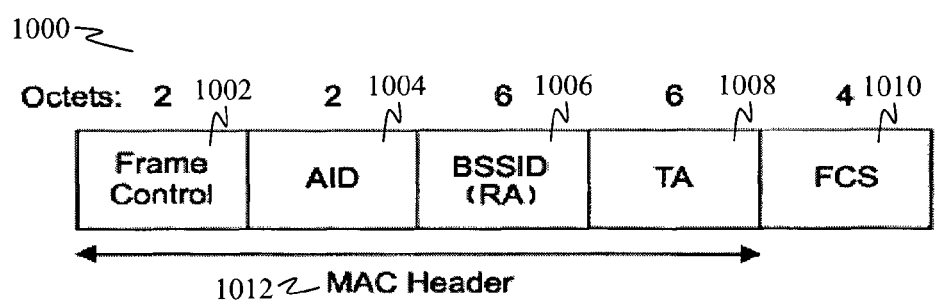
FIG. 10 shows a PS-Poll frame format, in accordance to various embodiments.

In FIG. 10, the PS-Poll frame format 1000 includes a 2-octet frame control 1002, a 2-octet AID 1004, a 6-octet BSSID (receiver address, RA) 1006, a 6-octet transmitter address (TA) 1008, and a 4-octet frame check sequence (FCS) 1010. The frame control 1002, the AID 1004, the BSSID (RA) 1006, and the (TA) 1008 makes up the media access control (MAC) header 1012.

The format of the AID field in the PS-Poll is shown in Table 4.

TABLE 4

| Bits 0-13 | Bit 14 | Bit 15 | Usage |
|---|---|---|---|
| 0-32 767 | | 0 | Duration value (in microseconds) within all frames other than PS-Poll frames transmitted during the CP, and under HCF for frames transmitted during the CFP |
| 0 | 0 | 1 | Fixed value under point coordination function (PCF) within frames transmitted during the CFP |
| 1-16 383 | 0 | 1 | Reserved |
| 0 | 1 | 1 | Reserved |
| 1-2007 | 1 | 1 | AID in PS-Poll frames |
| 2008-16 383 | 1 | 1 | Reserved |

For most frames, this field has shared definition of AID or Duration. The exact definition is indicated by Bit 14 and Bit 15. When both bits are set, the definition of AID is used. It should be noted that only AID values from 1 to 2007 are supported whereas values beyond 2007 are reserved. This is due to the limited length of the TIM IE, which supports a maximum of 2007 unicast AIDs.

Upon reception of the PS-Poll, the AP may transmit the buffered data to the STA immediately. Alternatively, the AP may choose to transmit the buffered data at a later time. In one example, the AP sends an ACK to the STA and the STA has to listen for the data packet.

Figure 11A:
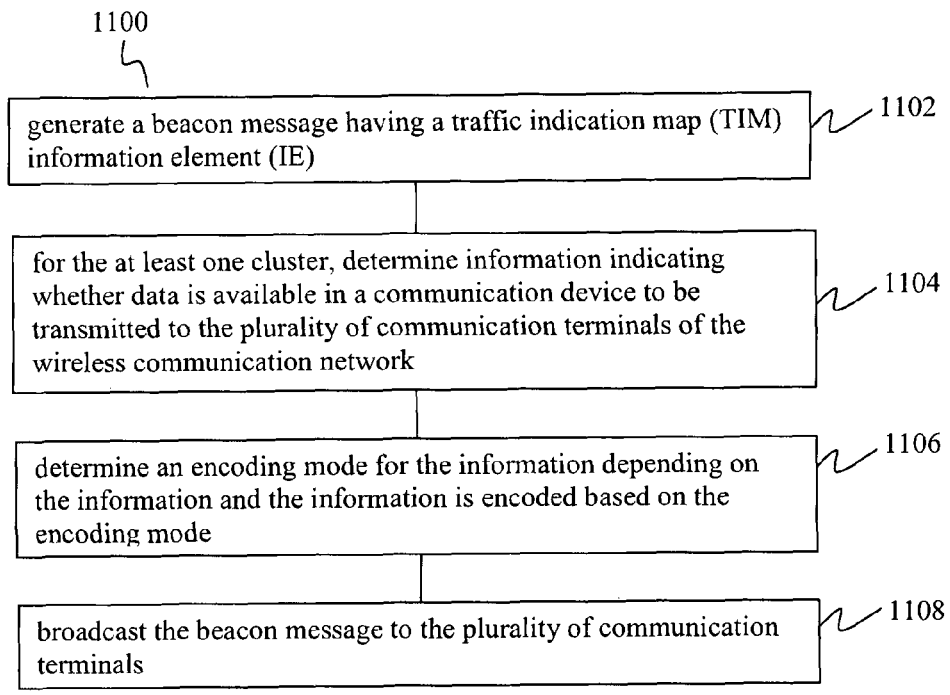
FIGS. 11A and 11B respectively show a flow diagram of a method of simultaneously addressing a plurality of communication terminals of a wireless communication network, in accordance to various embodiments.

In a third aspect, a method of simultaneously addressing a plurality of communication terminals of a wireless communication network 1100 may be provided as shown in FIG. 11A. At 1102, a beacon message having a traffic indication map (TIM) information element (IE) is generated. The TIM IE may include a partial virtual bitmap field including at least one cluster, and a bitmap control field indicating the number of clusters in the partial virtual bitmap field. At 1104, for the at least one cluster, information indicating whether data is available in a communication device to be transmitted to the plurality of communication terminals of the wireless communication network is determined. At 1106, an encoding mode for the information is determined depending on the information and the information is encoded based on the encoding mode. The at least one cluster may include the encoded information and indicates the encoding mode. At 1108, the beacon message is broadcasted to the plurality of communication terminals corresponding to the at least one cluster.

As used herein, the term "simultaneously addressing" refers to addressing a number of communication terminals at the same time or at least partially at the same time.

The terms "communication terminal", "wireless communication network", "information", "encoding mode", and "beacon message" are as defined above. For example, the communication terminal at 1102 may be the communication terminal 508, 900; the communication device at 1102 may be the communication device 500, 906; the beacon message at 1106 may be the beacon message 505, 904 of FIG. 5 and FIG. 9, respectively.

Figure 11B:
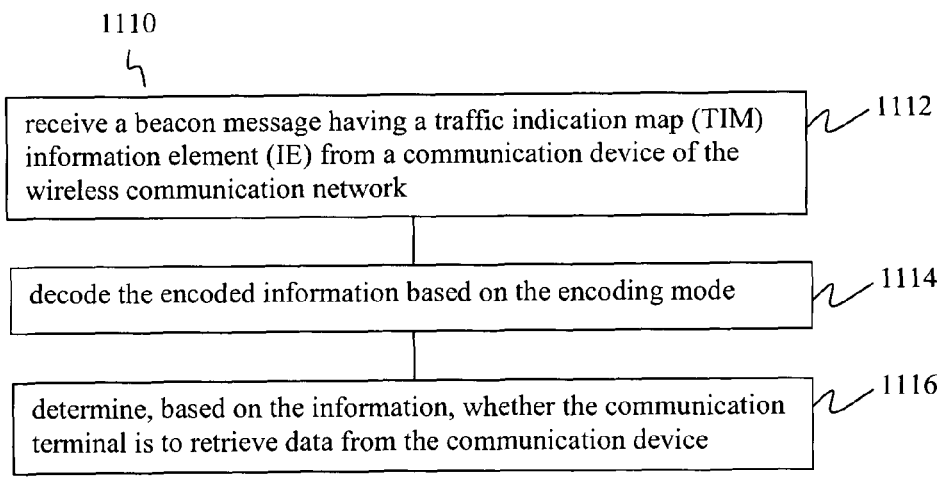

In a fourth aspect, another method of simultaneously addressing a plurality of communication terminals of a wireless communication network 1110 may be provided as shown in FIG. 11B. At 1112, a beacon message having a traffic indication map (TIM) information element (IE) is received from a communication device of the wireless communication network. The TIM IE may include a partial virtual bitmap field including at least one cluster, and a bitmap control field indicating the number of clusters in the partial virtual bitmap field, and the at least one cluster may include an encoded information and indicate an encoding mode. At 1114, the encoded information is decoded based on the encoding mode. At 1116, based on the information, it is determined whether the communication terminal is to retrieve data from the communication device. The beacon message is for a group of communication terminals; and the communication terminal is part of the group.

The terms "communication terminal", "communication device", "wireless communication network", "information", "encoding mode", "beacon message", and "group" are as defined above. For example, the communication terminal at 1112 may be the communication terminal 508, 900; the communication device at 1112 may be the communication device 500, 906; the message at 1116 may be the beacon message 504, 904 of FIG. 5 and FIG. 9, respectively.

Figure 12:
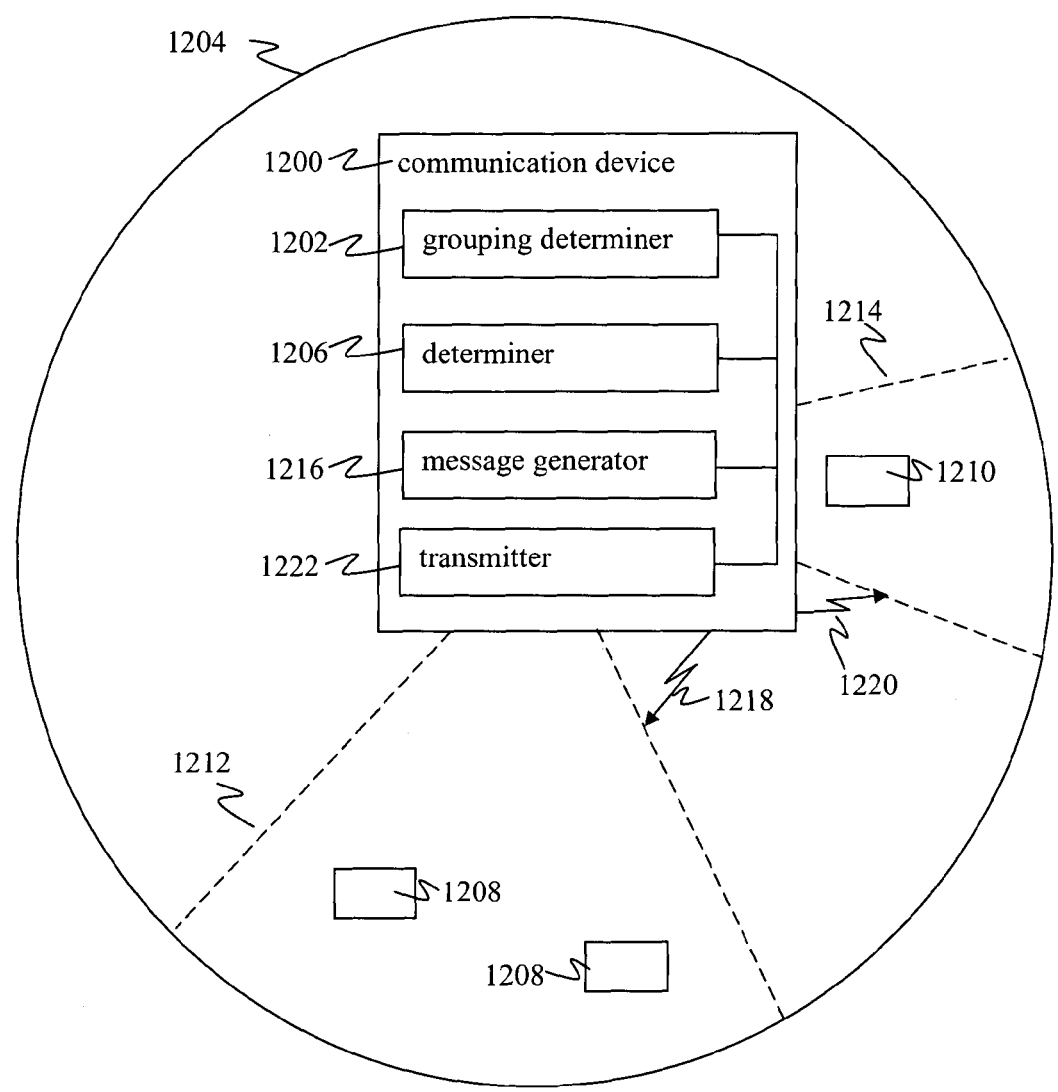
FIG. 12 shows a schematic diagram of another communication device, in accordance to various embodiments.

In a fifth aspect, a communication device of a wireless communication network may be provided as shown in FIG. 12. In FIG. 12, the communication device 1200 includes a grouping determiner 1202 configured to divide a plurality of communication terminals of the wireless communication network 1204 into groups based on geographical location; a determiner 1206 configured to determine, for a first buffered data to be sent to a first communication terminal 1208 of the plurality of communication terminals and for a second buffered data to be sent to a second communication terminal 1210 of the plurality of communication terminals, a first group 1212 to which the first communication terminal 1208 belongs and a second group 1214 to which the second communication terminal 1210 belongs; a message generator 1216 configured to generate a first message 1218 and a second message 1220, wherein each of the first message 1218 and the second message 1220 includes information respectively indicating that the first buffered data and the second buffered data are to be sent from the communication device 1200; and a transmitter 1222 configured to transmit the first message 1218 to the communication terminals 1208 of the first group 1212 and the second message 1220 to the communication terminals 1210 of the second group 1214 at least partially at the same time.

The terms "communication device", "communication terminal", "wireless communication network", "divide", "determine", and "generate" may be as defined above.

In the context of various embodiments, the term "message" generally refers to a short information sent from one entity to at least another one entity. A message may be a packet.

In various embodiments, the first message 1218 may be configured to be transmitted using a first transmission signal and the second message 1220 may be configured to be transmitted using a second transmission signal.

In other embodiments, the first message 1218 and the second message 1220 may be configured to be transmitted using a third transmission signal.

The first message 1218 and the second message 1220 may be the same. Each of the first message 1218 and the second message 1220 may be a beacon message.

Each of the first message 1218 and the second message 1220 may include a traffic indication map (TIM) or may further include information about the first group 1212 and the second group 1214 respectively, each corresponding to a group identity (GID).

The information may include an association identification (AID).

In various embodiments, the transmitter 1222 may be further configured to transmit the first buffered data to the first communication terminal 1208 and the second buffered data to the second terminal 1210. In one embodiment, the first buffered data and the second buffered data may be the same.

In various embodiments, each of the groups (for example, the first group 1212 or the second group 1214) corresponds to a sector within which the communication terminals of the corresponding group 1212, 1214 are located.

In the context of various embodiments, the term "sector" refers to a geographical area or a part thereof. It should be appreciated that a geographical area may contain a number of sectors. Each of these sectors may have different boundaries and sizes. For some examples, the sectors may also have different boundary shapes.

In various embodiments, the transmitter 1222, when transmitting the first message 1218 to the communication terminals of the first group 1212, and the second message 1220 to the communication terminals of the second group 1214, may be configured to send the first message 1218 into the corresponding sector within which the communication terminals of the first group 1212 are located, and to send the second message 1220 into the corresponding sector within which the communication terminals of the second group 1214 are located, respectively.

In various embodiments, the communication device 1200 may further include a receiver configured to receive a first signal and a second signal from the first communication terminal 1208 and the second communication terminal 1210, respectively.

The term "receiver" may be as defined above. In some examples, the receiver and the transmitter 1222 of the communication device 1200 may be combined into a single package, referred to as a transceiver, as described above.

The determiner 1206 may be further configured to determine from which sectors the first signal and the second signal are received; thereby determining the groups 1212, 1214 to which the first communication terminal 1208 and the second communication terminal 1210 respectively sending the first signal and the second signal belong.

The determiner 1206, when determining from which sectors the first signal and the second signal are received, may be configured to measure each of the first signal and the second signal.

As used herein, the term "measure" may refer to determining the signal's strength.

Each of the first signal and the second signal may include a control signal, a management signal, or a data signal. In some embodiments, each of the first signal and the second signal may include an association request or a feedback signal. For example, a feedback signal may include a message indicating to which sector a communication terminal belongs.

In some embodiments, the first message 1218 may include a first scheduling information indicating when the first communication terminal 1208 in the first group 1212 can transmit to the communication device 1200 the first signal for transmitting the first buffered data; and the second message 1220 may include a second scheduling information indicating when the second communication terminal 1210 in the second group 1214 can transmit to the communication device 1200 the second signal for transmitting the second buffered data.

As used herein, the term "scheduling information" refers to information about packet scheduling.

In various embodiments, the communication device 1200 may further include an antenna configured to direct the first message 1218 or the second message 1220 to at least one sector; and to receive at least one signal from the at least one sector.

In some embodiments, the antenna may include an omni-directional antenna or a sector antenna.

The term "signal" may be defined as above.

Figure 13:
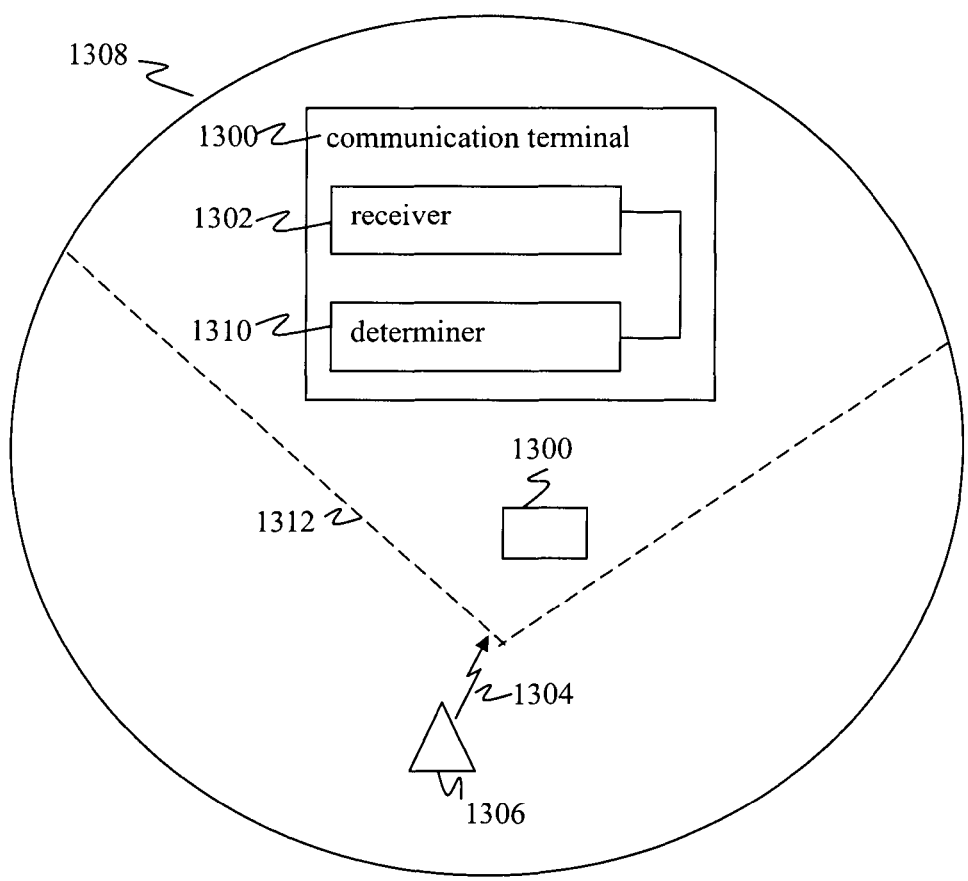
FIG. 13 shows a schematic diagram of another communication terminal, in accordance to various embodiments.

In an example, a communication terminal of a wireless communication network may be provided as shown in FIG. 13. In FIG. 13, the communication terminal 1300 may include a receiver 1302 configured to receive a message 1304 from a communication device 1306 of the wireless communication network 1308; and a determiner 1310 configured to determine based on the message 1304 whether the communication terminal 1300 is to retrieve data from the communication device 1306, wherein the message 1304 is addressed to a group of communication terminals 1312; wherein the communication terminal 1300 is part of the group 1312; and wherein the group 1312 is formed based on geographical locations of the communication terminals.

The terms "communication terminal", "communication device", "wireless communication network", "message", "determine", "group" may be as defined above.

For example, the communication terminal 1300, the communication device 1306, and the message 1304 may be the first or second communication terminal 1208, 1210, the communication device 1200, and the first or second message 1218, 1220 of FIG. 12.

In this example, the message 1304 may include the data to be received from the communication device 1306. The message 1304 may also include a traffic indication map (TIM) and information about the group 1312.

The communication terminal 1300 may be identified by an association identity (AID) in the wireless communication network 1306. The communication terminal 1300 may have a group identity (GID) for use in identifying the group of communication terminals 1312 to which the communication terminal 1300 belongs.

The determiner 1310 may be configured to determine that the communication terminal 1300 is to retrieve a buffered data from the communication device (or be in an active mode) if the GID and the AID of the communication terminal 1300 respectively match the information about the group 1312 and an address of the TIM; or to determine that the communication terminal 1300 is to be in a power saving mode if at least one of the GID and the AID of the communication terminal 1300 fails to match the information about the group 1312 and any address of the TIM respectively.

The communication terminal 1300 may further include a transmitter configured to send a power saving poll message to the communication device 1306 when the communication terminal 1300 is determined to retrieve the buffered data from the communication device (or be in the active mode)

and the communication terminal 1300 is further configured to receive the buffered data from the communication device 1306. The transmitter may also be configured to send a feedback signal to the communication device 1306 to indicate to which sector the communication terminal belongs based on the GID in the received message.

The receiver 1302 and the transmitter of the communication terminal 1300 may be combined into a single package, referred to as a transceiver, as described above.

Figure 14:
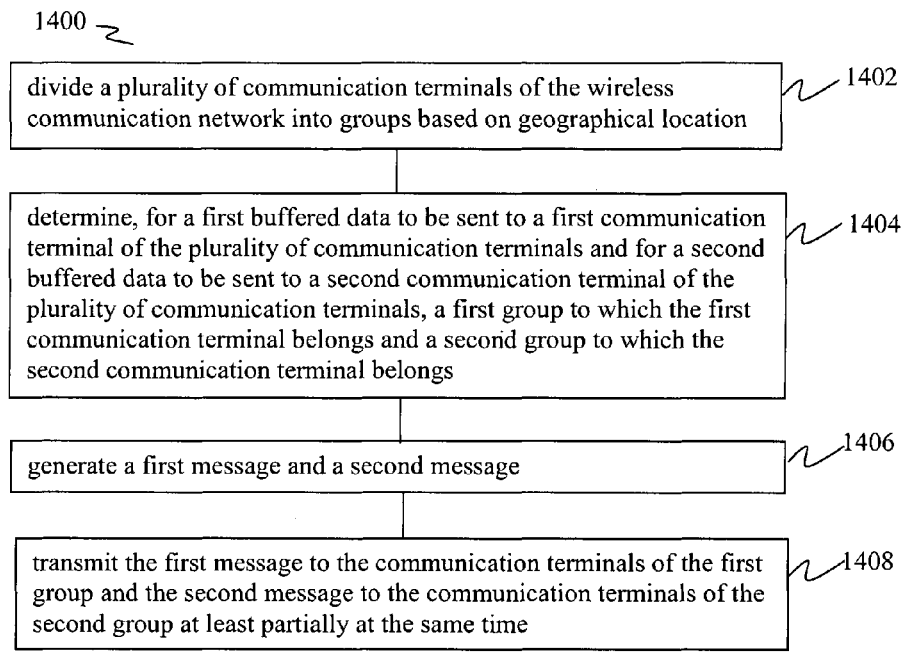
FIG. 14 shows a flow diagram of another method of simultaneously addressing a plurality of communication terminals of a wireless communication network, in accordance to various embodiments.

In a sixth aspect, a method of simultaneously addressing a plurality of communication terminals of a wireless communication network 1400 may be provided as shown in FIG. 14. At 1402, a plurality of communication terminals of the wireless communication network is divided into groups based on geographical location. At 1404, for a first buffered data to be sent to a first communication terminal of the plurality of communication terminals and for a second buffered data to be sent to a second communication terminal of the plurality of communication terminals, a first group to which the first communication terminal belongs and a second group to which the second communication terminal belongs are determined. At 1406, a first message and a second message, wherein each of the first message and the second message includes information respectively indicating that the first buffered data and the second buffered data are to be sent from the communication device, are generated. At 1408, the first message is transmitted to the communication terminals of the first group and the second message is transmitted to the communication terminals of the second group at least partially at the same time.

The terms "simultaneously addressing", "communication terminal", "wireless communication network", "divided", "group(s)", and "message" are as defined above. For example, the communication terminal at 1402 may be the communication terminal 1208, 1210, 1300; the message at 1406 may be the first message 1218 or the second message 1220, or the message 1304; and the group at 1404 may be the first group 1212 or the second group 1214, or the group 1312 of FIG. 12 and FIG. 13, respectively.

In various embodiments, the method 1400 may further include dividing the plurality of communication terminals of the wireless communication network into G groups based on the geographical locations with respect to the communication device, wherein each of the first group and the second group is one of the G groups.

In one embodiment, determining the first group to which the first communication terminal belongs and the second group to which the second communication terminal belongs may further include determining based on a quality measurement of a first signal received from the first communication terminal and a quality measurement of a second signal received from the second communication terminal.

In another embodiment, determining the first group to which the first communication terminal belongs and the second group to which the second communication terminal belongs may further include determining based on a first feedback signal received from the first communication terminal and a second feedback signal received from the second communication terminal; and wherein the first feedback signal comprises information indicating a first signal quality measurement by the first communication terminal and the second feedback signal comprises information indicating a second signal quality measurement by the second communication terminal.

In these embodiments, the quality measurement of the first signal, the quality measurement of the second signal, the first signal quality measurement, and the second signal quality measurement may be performed during an association process or during normal operation.

As used herein, the terms "quality measurement" or "signal quality measurement" refers to a measurement made to a signal in order to determine the quality of the signal. "The term "quality" may be mainly decided by the frequency of transmission and the characteristics of the transmission media. Transmission range, transmission power level, throughput or coverage, or connectivity may also determine to the quality of the signal.

In one embodiment, transmitting the first message to the communication terminals of the first group and the second message to the communication terminals of the second group at least partially at the same time at 1408 may include transmitting the first message to the communication terminals of the first group using a first transmission signal and the second message to the communication terminals of the second group using a second transmission signal at least partially at the same time.

In another embodiment, transmitting the first message to the communication terminals of the first group and the second message to the communication terminals of the second group at least partially at the same time at 1408 may include transmitting the first message to the communication terminals of the first group and the second message to the communication terminals of the second group using a third transmission signal at least partially at the same time.

As defined above, the first message and the second message may be the same and each of the first message and the second message may be a beacon message.

At 1408, transmitting the first message to the communication terminals of the first group and the second message to the communication terminals of the second group at least partially at the same time may include transmitting a plurality of the messages via A antennas simultaneously for G groups.

The method 1400 may further include receiving the message for each of the G groups.

The received messages (y) at the G groups may be determined based on $$y = Tx$$

wherein T is a G×A beamforming matrix, x is a A×1 vector corresponding to the transmitted messages, and y is a G×1 vector corresponding to the received messages.

As used herein, the term "beamforming" describes the application of beamforming coefficients (or interchangably referred to as weights) to spatial domain signals before transmitting the signals.

Various embodiments may be provided as described in a set of exemplary schemes (or addressing mechanisms) that supports addressing of multiple communication terminals in the wireless communication network.

In various exemplary schemes, an (information element) IE addressing method may be described and addressing any arbitrary STAs within one beacon may be possible. The addressing scheme may divide the 6000 STAs into several groups and may introduce new IEs in the beacon message. The addressing flexibility of the scheme may depend on the amount of signaling, or the number of IE bits introduced.

Multi-TIM Encoding

As discussed above, if new IEs are introduced, it may not be necessary to follow the format of the TIM in the current IEEE 802.11 specification. In fact, the current TIM format may also be changed to support more efficient encoding method. An efficient encoding method may often depend on the characteristics of the TIM. For different TIM characteristics, different encoding schemes may be used.

Figure 15:
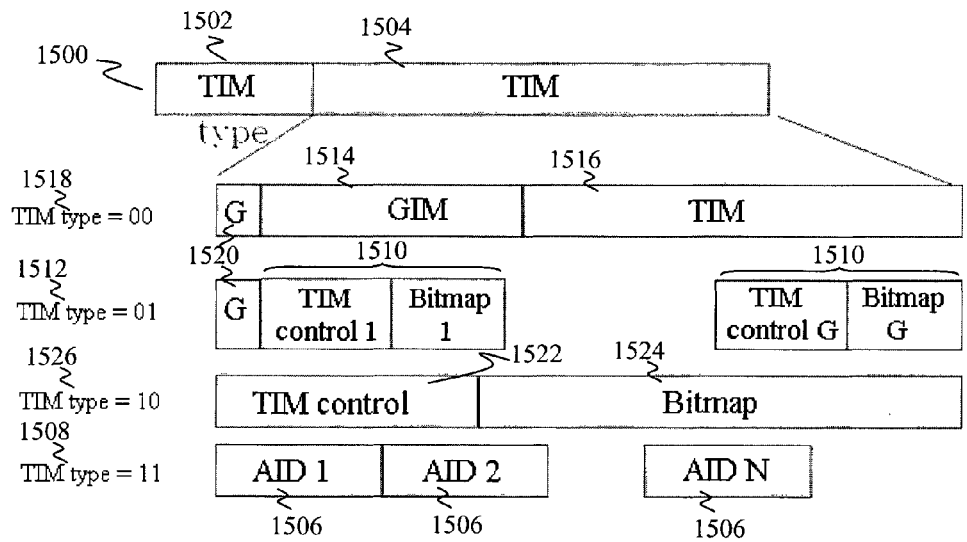
FIG. 15 shows examples of multiple TIM definitions, in accordance to various embodiments.

To support multiple TIM definitions, the method for the STA to interpret the TIM may be predefined and specified in the beacon. Specification of the definition may be implicit or explicit. In the former case, the STA may determine the decoding method based on the IEs received. In the latter case, the AP may specify the definition used for encoding explicitly in the beacon. For example, if M bits are used to specify the TIM definition 1500, a maximum of $2^M$ TIM definitions may be supported, as illustrated in FIG. 15, where M=2 in the TIM type field 1502.

The AP may choose the most efficient (or appropriate) method to encode the TIM 1504 and indicate the method in the M bits (i.e., under the TIM type 1502). For example, when only a few TIM bits are set and they are sparse, it may be more appropriate and direct to broadcast the AIDs 1506 directly where AIDs are represented in binary forms with a predetermined length (e.g. AID 3=0000000000011 for a 13-bit length) instead of using the bitmap (i.e., TIM type=11 1508). When the TIM bits are grouped into several clusters 1510, the dynamic grouping method (i.e., TIM type=01 1512) as described herein may be used instead. The TIM bits may also be indicated in a group indicator map 1514 for the TIM 1516 (i.e., TIM type=00 1518). In grouping, the number of groups G 1520 may be indicated. To compress the TIM definition, a TIM control 1522 may be used to perform inverse encoding on the bitmap 1524 (i.e., TIM type=10 1526).

TIM Encoding with Sign Bit

When the TIM type=10 1526 (FIG. 15), the sign of the TIM may be flipped to support efficient compression. For example, long strings of zeros bits in the bitmap offset may be compressed. When there are long strings of set bits in the bitmap, the sign of the bitmap may be flipped and the TIM may be compressed. One example is illustrated as follow:—

Original bitmap: 1111 1111 1001 0011
Current TIM encoding: Offset=0
    Bitmap length=16 (same as original bitmap)
Flipped bitmap: 0000 0000 0110 1100
TIM encoding with sign bit: Offset=2 bytes, sign=1
    Bitmap length=8 Bitmap: 0110 1100 where the sign bit is set to 1 to indicate that the bitmap is flipped and the encoding method (i.e., when TIM type=10 1526 (FIG. 15)) is used. In this case, by adding an additional sign bit, the bitmap length is observed to reduce to half of its original length.

It should be appreciated that bit flipping or inverse encoding is not only limited to TIM type=10, and it may be applied to most cases when a bitmap is used, such as when TIM type=00 or 01 (1518, 1512 of FIG. 15).

Addressing Multiple STAs Using GID

In its basic form, the additional IE may be used to indicate group ID (GID). The GID-based method may group, for example, 6000 STAs into G groups with each group containing N STAs. G and N should satisfy G·N≥6000 (e.g., G=3, N=2000).

In this example, the STA first sends an Association Request to the AP. The STA may indicate its preferred grouping option here. Otherwise, it is left to the AP to decide group assignment. If grouping is determined by the AP, no change in the Association Request frame format is needed.

The AP replies with Association Response, where the reserved AID values from 2008 to 6000 are used to for extended AID. The AID uses the 14 least significant bits (LSB), and Bit 14 and Bit 15 (the two most significant bits (MSB)) are both set to 1.

The GID is implied in the extended AID as follows:—

$$GID=\text{mod}(AID,N) \tag{1}$$

where mod(x,y) is the modulus after division of x by y. The GID is used in the beacon together with the TIM to support up to 6000 STAs. N is the predefined number of STAs in each group.

For comparison, the STA may refer to the communication terminal 508, 900 and the AP may refer to the communication device 500, 906 of FIG. 5 and FIG. 9, respectively.

The PS-Poll procedure with the GID-based addressing method may work as follows:—

The AP broadcasts a beacon where an additional IE needs to be added to indicate the GID. Only the STAs whose GID (GID_sta) is the same as the AP's broadcasted GID (GID_ap) are addressed by this beacon. The TIM in the beacon interprets similarly as for the current IEEE 802.11 specification except that now the bitmap corresponds to AID of the eligible STAs whose GID_sta is equal to the AP's broadcasted GID_ap. In other word, the STA needs to compare the following two broadcasted parameters with its local calculations:—

$$GID\_ap=\text{mod}(AID\_sta,N) \tag{2}$$

$$Bit\_set\_in\_TIM=\text{rem}(AID\_sta,N) \tag{3}$$

where the function rem(x,y) denotes the remainder of dividing x by y.

STAs who meet both criteria above, each sends a PS-Poll message to the AP. The AID field uses reserved value to support AIDs from 1 to 6000. If the AP's broadcasted GID does not equal to the STA's GID, the STA only synchronizes and goes to power saving (PS) mode.

Figure 16:
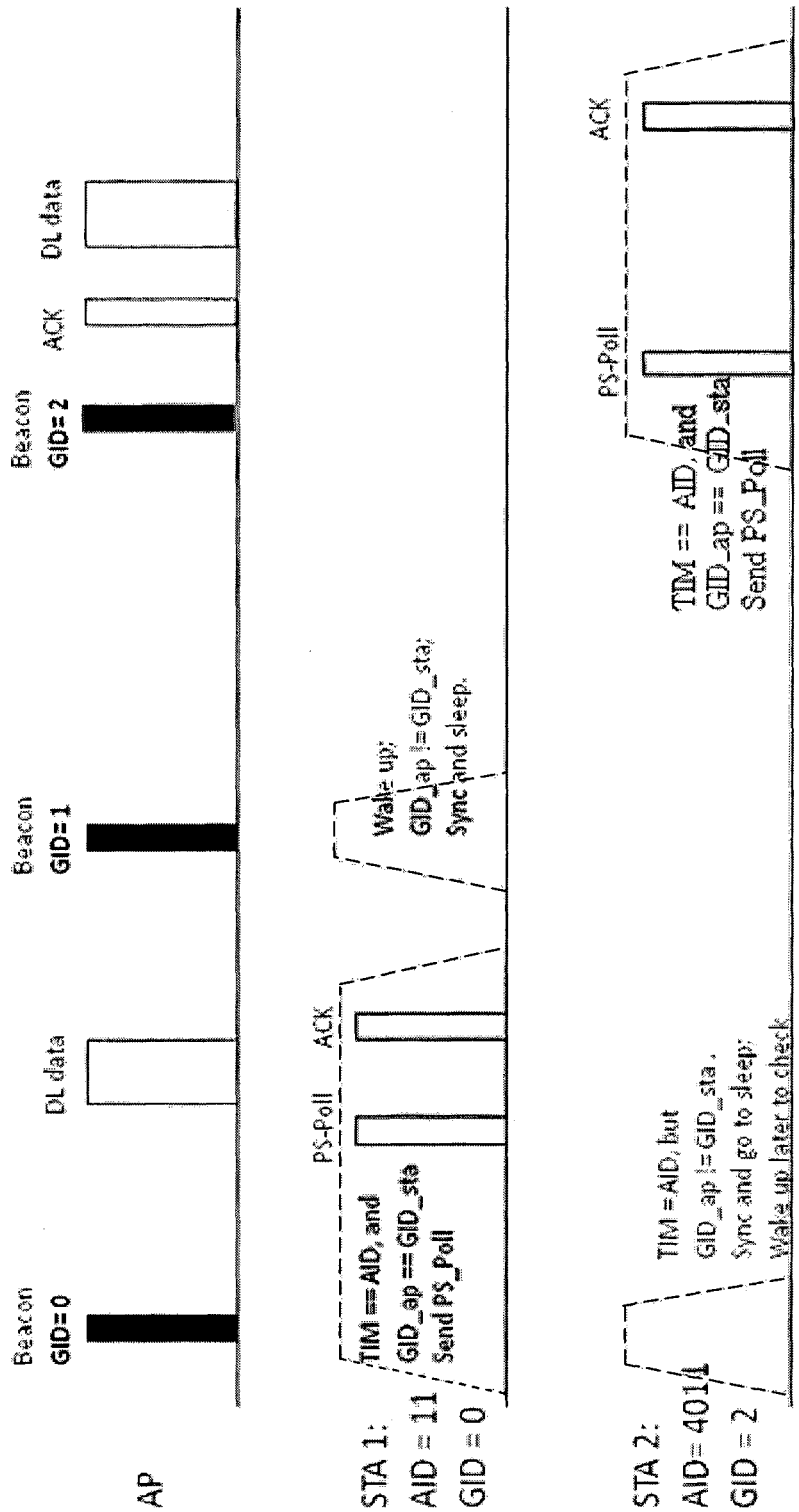
FIG. 16 shows a schematic diagram illustrating the operation of PS-Poll with GID-based addressing mechanism, in accordance to various embodiments.

An example of the operation of PS-Poll process is shown in FIG. 16, where G=3 and N=2000. The GID value in the first beacon is 0, which means that STAs whose AID ranges from 1 to 2000 are addressed. The Bit 11 in TIM is set. Hence the STA whose AID is 11 will send PS-Poll to the AP, while the STA whose AID is 4011 will only synchronize and go to PS mode. The AP immediately delivers the buffered data. The STA will wake up to check the next Beacon. In the second Beacon, the GID is 1 and the Bit 11 in TIM is also set to address the STA with AID 2011. The STA will send PS-Poll to AP to get the buffered data. The AP delivers the buffered data in a later time.

If the GID sequence is pre-determined, the STA may predict when to wake up to check its buffered data based on the current received GID. In this way, it does not have to listen to every beacon and therefore is able to achieve larger power-saving. Assume that the GID sequence repeats as GID=0, GID=1, GID=2 . . . . In the example shown in FIG. 16, if the STA with AID 4011 detects that the current GID is 0, it knows that the beacon after next is dedicates to it (GID=2), and it may skip the next beacon (GID=1) and only wake up at the beacon whose GID=2.

The PCF with the GID based method may work as follows:—

Figure 17:
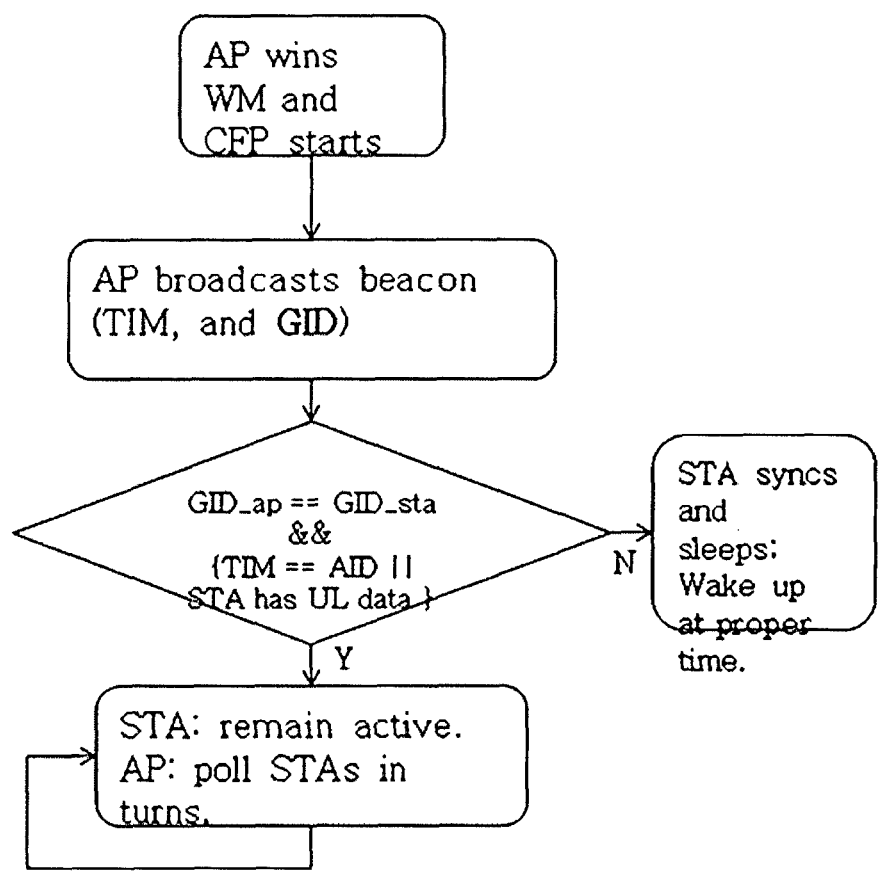
FIG. 17 shows a flow chart illustrating the PCF process with respect to the operation of FIG. 18 below, in accordance to various embodiments.

Once the AP contends and wins the channel, it may start the PCF process. The AP broadcasts a beacon message including TIM and GID. Upon reception of the beacon, STA checks based on Eqns (2) and (3). If Eqn (2) is not satisfied, STA synchronizes and goes to PS mode. If Eqn (2) is satisfied and the STA has uplink data, the STA stays in active mode. If both Eqns (2) and (3) are satisfied, the STA stays in active mode to received downlink data. The AP polls active STA in turns. The PCF process is illustrated as shown in FIG. 17.

Figure 18:
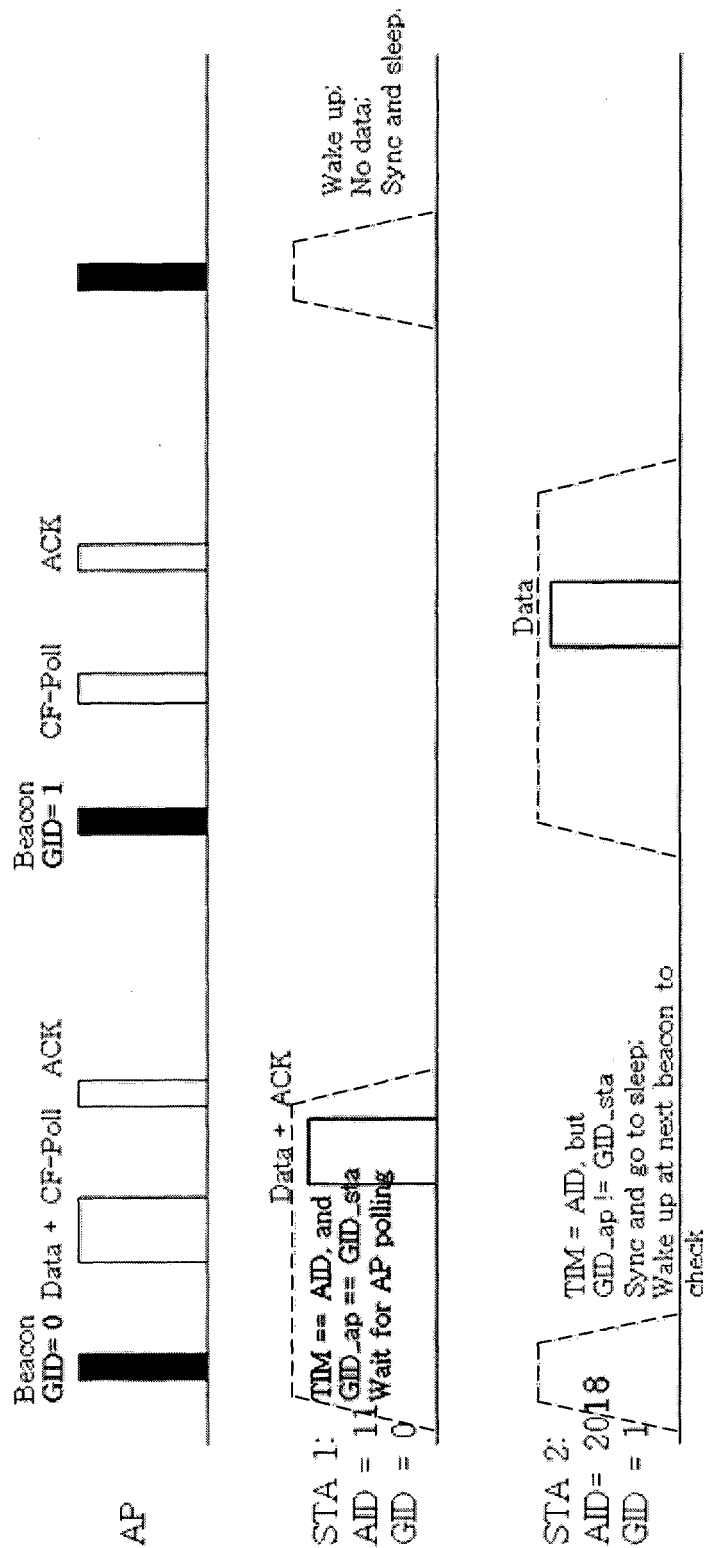
FIG. 18 shows a schematic diagram illustrating the operation of PCF with GID-based addressing mechanism, in accordance to various embodiments.

One example of the operation of PCF is shown in FIG. 18, where G=3 and N=2007. In the first beacon, the GID is 0 and Bit 11 in TIM is set to 1. The STA with AID 11 stays in active mode and wait for the AP to deliver buffered data. The AP may also piggyback the contention-free poll (CF-Poll) message at the data to poll the STA for uplink data. For STA with AID 2018, although the corresponding TIM bit is set (i.e., Bit 18 in the TIM is set to "1"), the GID is 0 instead of 1. Hence the STA is not eligible and it synchronizes and goes to PS mode. The STA with AID 2018 is active at the next beacon, where GID is 1. For example, Bit 11 of TIM is not set, which means that the AP does not have downlink data to the STA. However, the STA now has uplink data for the AP, so it stays in active mode and sends uplink data to the AP upon reception of a CF-Poll message from the AP.

In the third beacon, the AP has no downlink data for the STA and the STA does not have uplink data either. Hence the STA simply synchronizes and goes into PS-mode.

The additional (new) IE based addressing method may be more dynamic. For example, instead of adding an IE for GID, two IEs similar to the current TIM may be added, as shown in FIG. 19. The three TIM IEs used together may support simultaneous addressing of up to 6000 STAs with one beacon. The bitmap control field contains the offset of the partial virtual bitmap. The maximum length of each partial virtual bitmap is 2007 bits. During association, the STAs are assigned AID from 1 to 6000. If the assignment of AIDs to each IE is fixed, the first partial virtual bitmap may cover AID 1 to 2007, the second bitmap may cover AID 2008 to 4014, and the remaining AIDs may be covered by the third bitmap. Alternatively, the assignment can be made more uniformly such that each TIM IE covers 2000 STAs.

Addressing Multiple STAs with Encoding Schemes

The assignment of AIDs covered by each IE may be dynamic by introducing new TIM definitions or encoding schemes. Support for new/multiple TIM definitions are described hereinabove. The additional IEs do not necessarily need to follow the format of TIM IE in the current specification, and may be made more compact and efficient.

For example, if the set bits in TIM may be grouped into G clusters and the G bitmaps are short enough so that they may be combined into a single TIM IE, an additional IE format may be introduces as shown in FIG. 20. The first field indicates the total number of groups (G) in the subsequent bits. Hence the subsequent bits are divided into G segments. Each segment contains a bitmap control field, a length field, and a partial virtual bitmap field. The bitmap control field indicates the offset of the subsequent partial virtual bitmap. The length field indicates the total number of bits of the segment so that the STA can find the starting bits of the next segment. The partial virtual bitmap works the same as the current TIM definition, but covers a smaller range of AIDs. For example, the format shown in FIG. 20 may refer to the format when TIM type=01 1512 (FIG. 15). Various modification will be apparent to those skilled in the art. For example, the partial virtual bitmap for each cluster/segment/group may also be replaced by the other encoding methods, for example, various methods as described herein.

If ambiguity is allowed in addressing, the IE may be made more compact as shown in FIG. 21. The first field is fixed length and indicates the number of groups (G). The subsequent group indicator map (GIM) field is a bitmap with G bits. GIM indicates whether the STAs of the corresponding group are eligible to decode the subsequent TIM. If the GIM bit is set, the corresponding STAs in the group continues to decode the subsequent TIM. If the GIM bit is zero, the STA does not decode the subsequent TIM and goes to PS mode.

The subsequent N bits constitute the TIM bitmap and have the same interpretation. For example, the format shown in FIG. 21 may refer to the format when TIM type=00 1518 (FIG. 15).

Addressing Multiple STAs Using Beacon Interval

The beacon interval (BI) based addressing method works by dividing the STAs into, for example, three groups. At each beacon period, only one group with a maximum of 2007 STAs is addressed. The grouping may also be generalized to G groups with N STAs each. Using this approach, no change of current frame format is needed and no additional resources such as BSSID or additional signaling is needed. However, each beacon may only address STAs in one group and additional processing may be needed at the STA to calculate the group ID.

The association process may be similar to the method as described above. The STAs first send Association Request to the AP. The AP assigns an AID value to the successfully associated STA via the Association Response. The reserved AID values are used to support AID range from 1 to 6000. At the STA, the GID is interpreted same as in Eqn (1) where N=2007.

For comparison, the STA may refer to the communication terminal 508, 900 and the AP may refer to the communication device 500, 906 of FIG. 5 and FIG. 9, respectively.

When there is data buffered for PS STAs, the AP indicates the pending traffic via the TIM IE in the beacon. There is no change in the beacon frame format (as in Table 3). The STA extracts two parameters from the beacon, namely, the Timestamp (as seen in order 1 of Table 3) and the Beacon Interval (BI) (as seen in order 2 of Table 3). The Timestamp is used to update the local Time Synchronization Function (TSF) at the STA.

The STA may infer the GID_ap based on TSF and BI as:

$$\text{GID\_ap}=\text{remainder}(\text{mod}(\text{TSF},\text{BI}),G) \quad (4)$$

Figure 22:
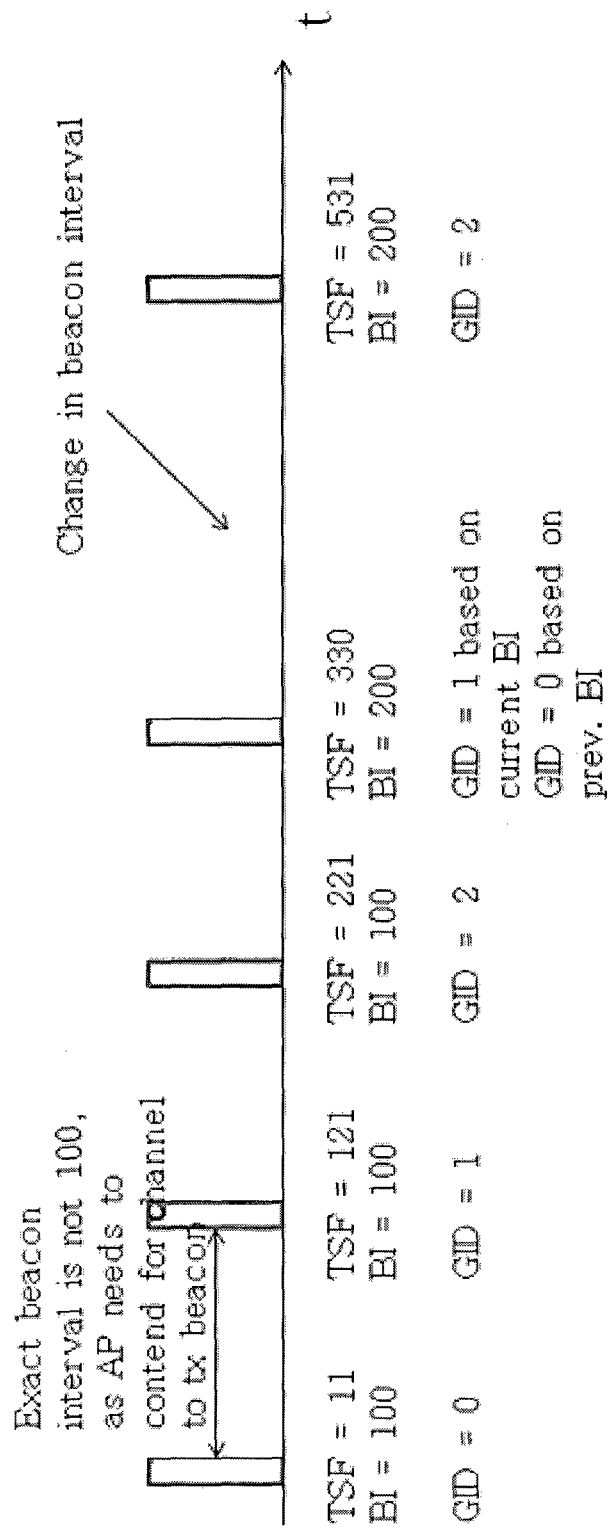
FIG. 22 shows an example of an addressing method based on BI, in accordance to various embodiments.

One example of the BI based address method is shown in FIG. 22 where G=3. The BI is initially 100 time units (TU). However, the AP may not be able to send the beacon at exactly 100 TU interval due to channel occupation. Hence beacon transmission may be delayed due to the contention-based channel access mechanism to transmit the beacon.

Figure 23:
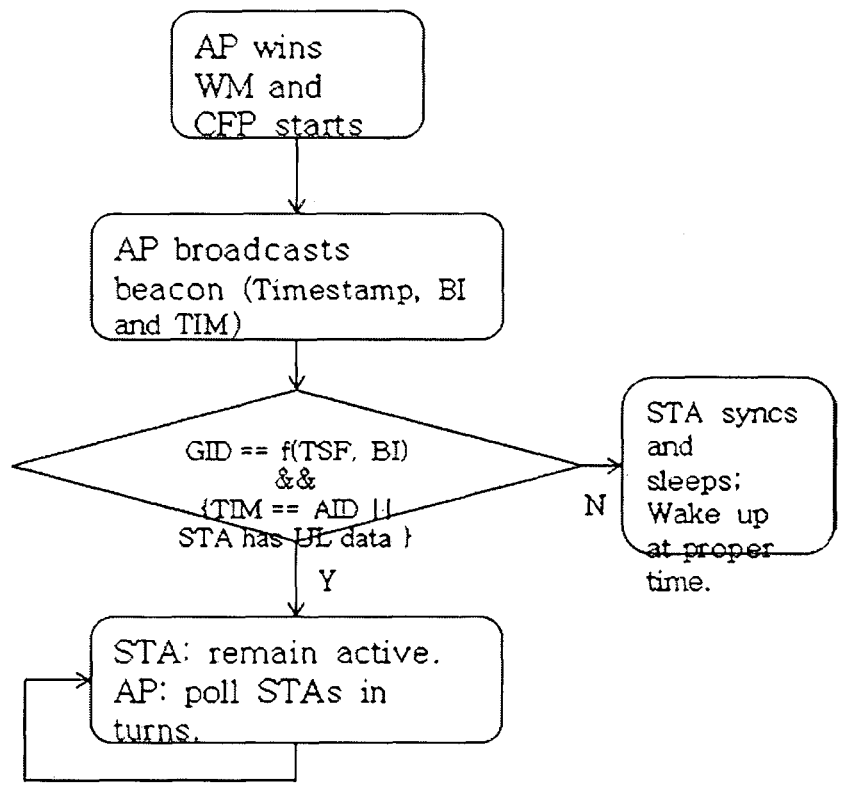
FIG. 23 shows a flow chart illustrating the operation of PCF with BI based addressing method, in accordance to various embodiments.

The STA compares the GID_ap with its local GID calculated from Eqn (1). If they are identical, the STA is in the eligible group and may check the TIM bits. If the GID value broadcasted by AP does not match the STA's local GID, the STA is not the intended recipient of TIM. Hence the STA synchronizes and goes to PS mode. If the TIM bit of the eligible STA is set, the STA sends a PS-Poll message via DCF. The operation of PCF for PS STA is shown in FIG. 23.

Due to the uncertainty in beacon transmission time and non-idealities such as clock drift, the GID calculation in Eqn (4) may be adjusted at the STA.

One example of adjustment of beacon delay is as follows:—

If: $\text{rem}(\text{TSF},\text{BI})<\alpha*\text{BI}$ $\text{GID}=\text{rem}(\text{mod}(\text{TSF}-\beta*\text{BI},\text{BI}),3)$ Else: $\text{GID}=\text{rem}(\text{mod}(\text{TSF},\text{BI}),3) \quad (5)$ where $\alpha$ and $\beta$ are adjustment parameters in the interval $[0,1]$.

Figure 24:
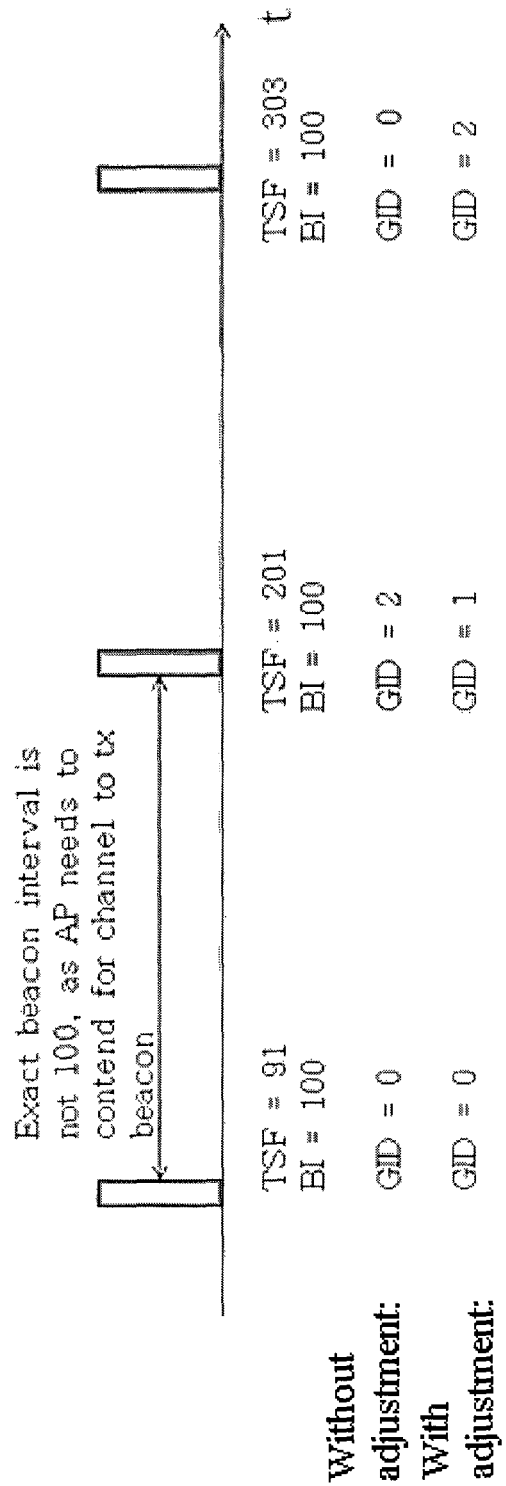
FIG. 24 shows an example of adjusted GID calculation, in accordance to various embodiments.

The comparison of BI based addressing methods with adjustment in Eqn (5) and without adjustment is shown in FIG. 24, where $\alpha=0.1$ and $\beta=0.5$.

In FIG. 24, at the first beacon, GID=0 for both cases with and without adjustments, and TSF=91. At the second beacon, GID=2 for the case without adjustment, while GID=1 for the case with adjustment; and TSF=201. At the third beacon, GID=0 for the case without adjustment, while GID=2 for the case with adjustment; and TSF=303.

Alternatively, the AP may also adjust the Timestamp value in the transmitted beacon so that the calculated GID at the STA is always the same as desired.

Besides adjusting the parameters for calculation, the beacon frame transmission may be enforced such that it is always transmitted with high priority, or even at guaranteed BI. Priority may be ensured by smaller contention window size and shorter inter-frame spacing time.

Figure 25:
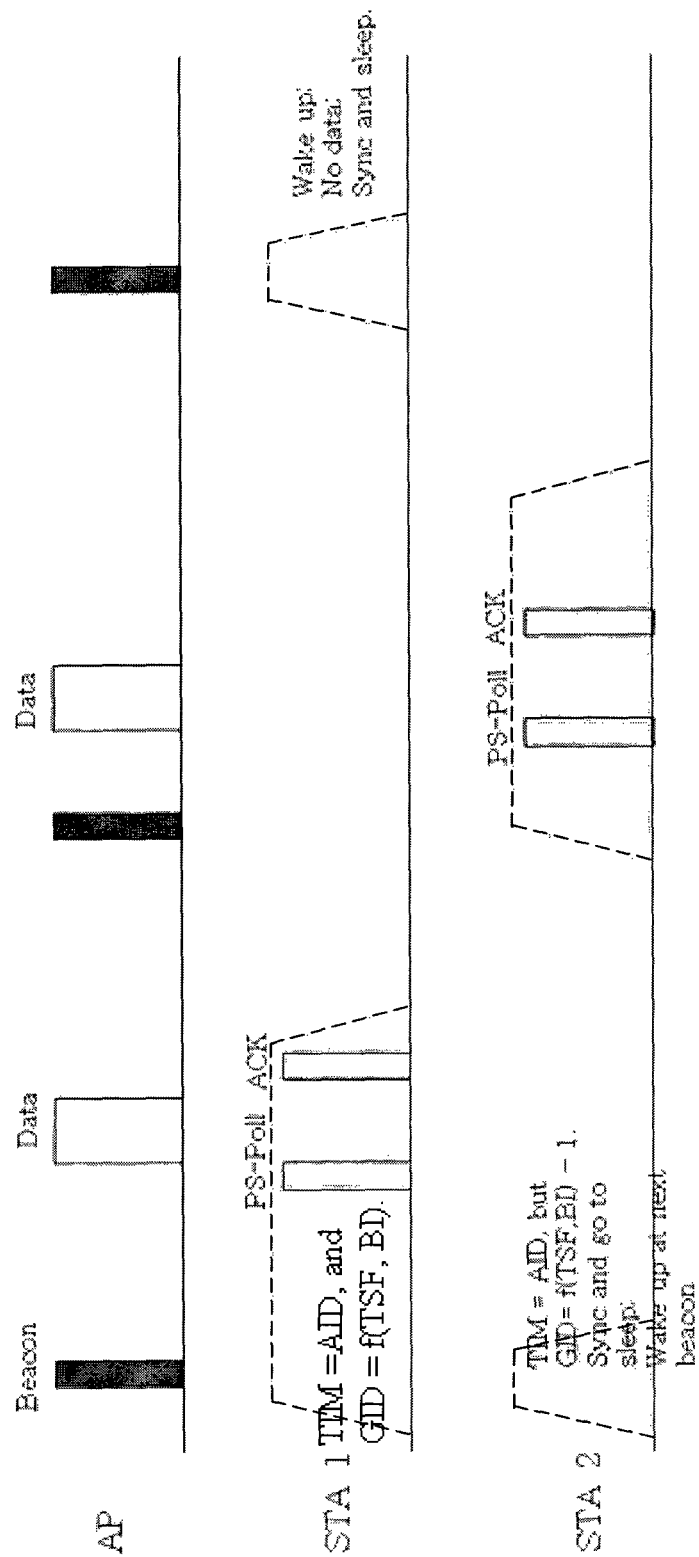
FIG. 25 shows a schematic diagram illustrating BI based addressing method in PS-Poll, in accordance to various embodiments.

An example of how BI based addressing method works in PS-Poll process is shown in FIG. 25. The function f(TSF, BI) is as shown in Eqn (4). The first beacon addresses STA 1, which is implied in the TSF and BI. STA 2, after calculation of Eqn (4), synchronizes and goes to sleep after receiving the first beacon. It wakes up for the second beacon.

Figure 26:
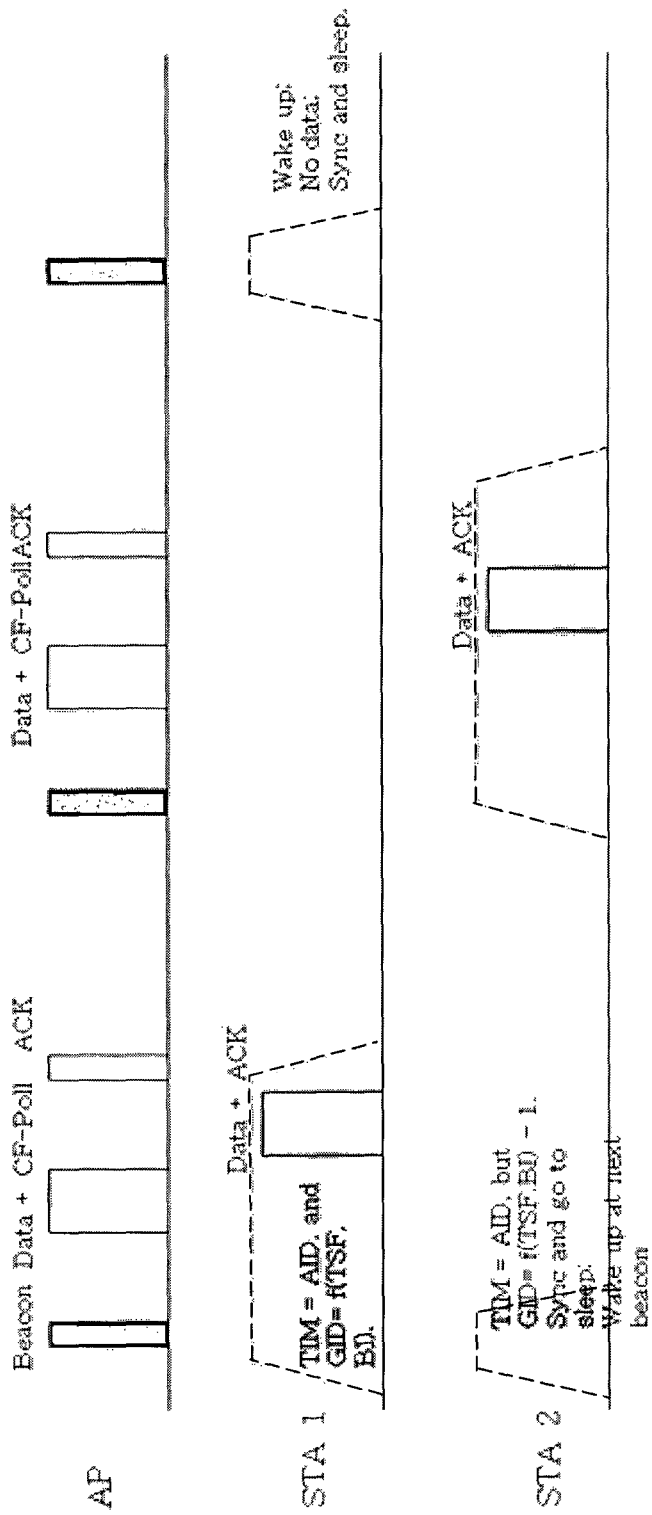
FIG. 26 shows a schematic diagram illustrating BI based addressing method in PCF, in accordance to various embodiments.

An example of how BI based addressing method works in PCF is shown in FIG. 26. The function f(TSF, BI) is as shown in Eqn (4). Eligible STA stays in active mode if it has uplink data or its TIM bit is set.

Spatial Method of Addressing Multiple STAs

Various embodiments relates to methods of addressing multiple devices for a wireless communication system, more particularly, to method of addressing efficiently a number of arbitrary devices, method of addressing efficiently a number of arbitrary devices within a group of devices and a method of grouping and addressing devices geographically and spatially in a wireless communication system, such as wireless local area network communication (WLAN) standard.

In a spatial grouping method in accordance with various embodiments, the STAs associated with AP may be divided into several groups using multiple antenna techniques or sector antennas. One or more additional (new) Information Elements (IEs) may be introduced in the beacon messages.

For comparison, the STA may refer to the first communication terminal 1208 or the second communication terminal 1210, or the communication terminal 1300 and the AP may refer to the communication device 1200, 1306 of FIG. 12 and FIG. 13, respectively.

In its basic form, an additional IE may be used to indicate group ID (GID). Similar to other GID-based methods as described above, the associated STAs may be grouped into G groups with each group containing N STAs. For example, G=3, N=2000 may address 6000 STAs in the same AP. The numbers of STAs in the groups in general may not be necessarily equal to one another. For example, Group 1 may have N1 STAs and Group 2 may have N2 STAs, where N1 and N2 may be different.

For example, in the method, the AP divides STAs into G (G≥2) sectors and broadcasts TIM for STAs within each sector simultaneously. A minimum of G sectorized antennas are used. Alternatively, a more advanced transmit beamforming antenna system may be used to form G fixed or dynamically or semi-dynamically changed beams at the same time. The STAs in each sector only hears their own beacon/TIM due to the physical location and the directivity of the signals from the AP. The operation of multiple antennas may be transparent to the STAs. An arbitrary number of STAs up to the maximum number assigned to a sector may be addressed using this method. Addressing of multiple sectors may be done concurrently. Hence there is no addressing delay. Use of multiple antennas has the advantages of, for example, range extension and interference reduction.

Figure 27:
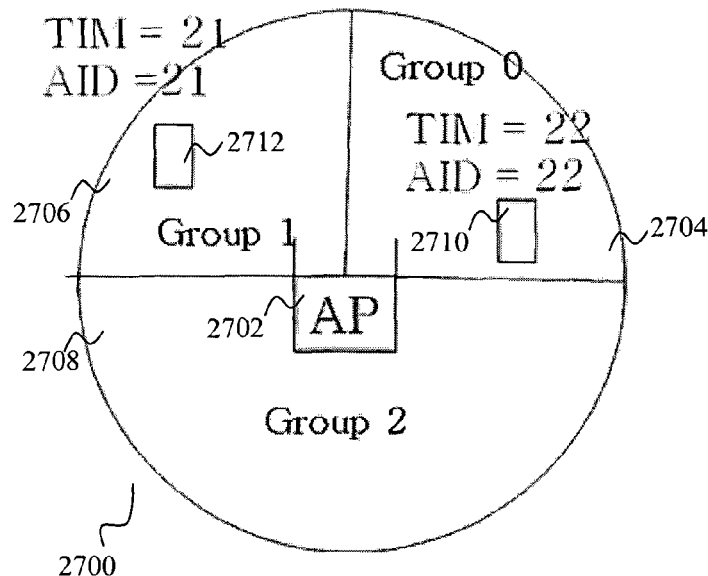
FIG. 27 shows a schematic diagram illustrating spatial division or sector based addressing/transmission method, in accordance to various embodiments.

One example of spatial division based addressing method is shown in FIG. 27. In FIG. 27, the coverage area 2700 of the AP 2702 is divided into three sectors 2704, 2706, 2708. The geographical areas of various sectors do not have to be equal. In the example, the 22nd STA 2710 in Group 0 2704 is paged in TIM (denoted TIM=22), while the 21st STA 2712 in Group 1 2706 is paged (denoted TIM=21). The TIMs are encoded properly into the transmitted data streams such that STAs (for example, STA 2710) in Group 0 2704 detects Group 0 beacon with TIM=22 and STAs (for example, STA 2712) in Group 1 2706 detects the Group 1 beacon with TIM=21. Hence STAs in each sector may be addressed unambiguously.

The STAs in the example are clustered based on their locations. The clustering of STAs may be done during association by the AP. In one mode, the assignment of STA to sector is determined based on AP's signal measurement. In another mode, the assignment is determined based on STA's signal measurement and feedback to the AP.

If the AP operates in the mode that it receives signals from the G sectors simultaneously, the AP is able to determine which sector the STA belong to, e.g. by finding the sector with the strongest received STA power, when the STA sends an Association Request to the AP.

Figure 28:
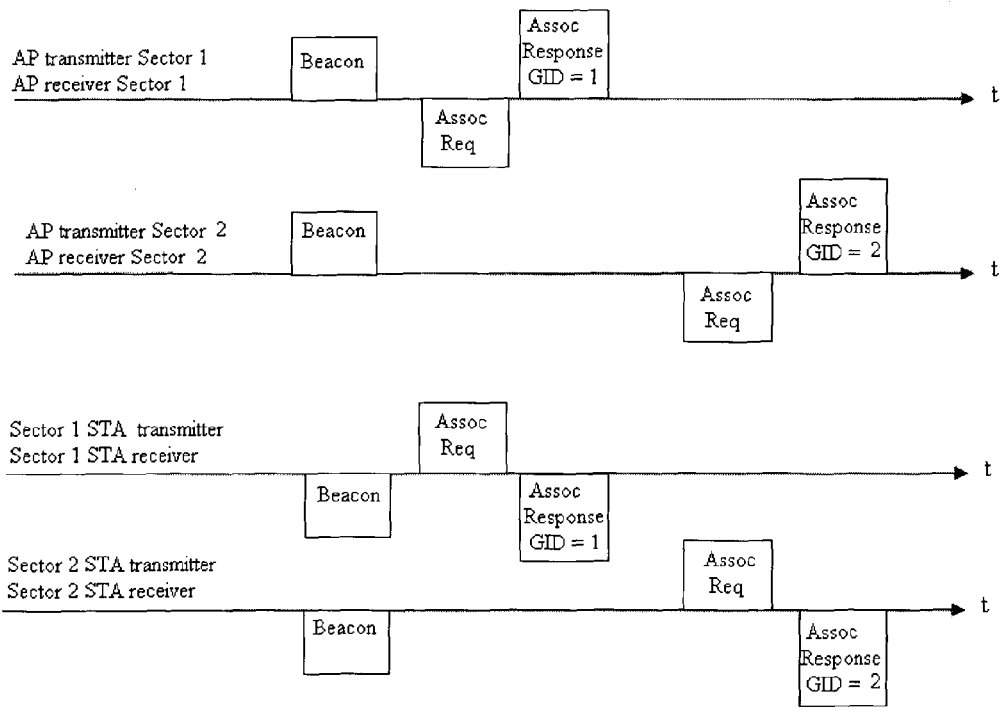
FIG. 28 shows an example of STA sector assignment by an AP with sectorized receiving antenna (G=2) where ACKs to unicast frame are omitted, in accordance to various embodiments.

An example of how the AP determines the sector assignment of a STA is shown in FIG. 28, where the AP operates two sectors and is able to receive simultaneously signals from the two sectors. FIG. 28 only uses two-sector operation for illustration. In more general form, the AP may operate G sectors simultaneously and receive signals from the G sectors simultaneously.

In FIG. 28, the AP broadcasts beacons to all the sectors. The content of the beacon may be identical for all the sectors, or it may be sector-dependent. Sector dependent beacon may contain TIM addressing the STAs belonging to the beacon sector only.

In FIG. 28, the beacon may be broadcasted omnidirectionally to all the sectors, or it may be broadcasted to each sector independently and simultaneously. Upon receiving the beacon, unassociated STAs transmits Association Request to the AP. Depending on the channel sensing capability, a STA in one sector may/may not be able to hear the transmission of a STA in another sector. FIG. 28 illustrates the case when the STA in sector 1 transmit the Association Request first. This may either be that the STA contends and wins the channel or that scheduling is performed by the AP, e.g. through a beacon or other scheduling messages received. As the AP listens to the transmission from each sector simultaneously, the Association Request is received by the respective antennas for sector 1. In reality, the Association Request may be received by antennas corresponding to more than one sector, and the AP may decide on which sector to associate the STA to. For example, the AP may assign the STA to the sector that receives the strongest signal. Similarly, when the AP receives the Association Request from sector 2 (or the strongest signal is received from sector 2), the AP assigns the STA to sector 2.

The STA clustering may not necessarily be done during association only. The AP may operate in the mode to receive signal simultaneously from all sectors and determine the assignment of STA to a sector based on the metric (e.g. signal strength) of the uplink transmission of the STA. The AP may also transmit other control/data signals to the STA individually or broadcast/multicast to multiple STAs and receive feedback from the STA later.

Figure 29:
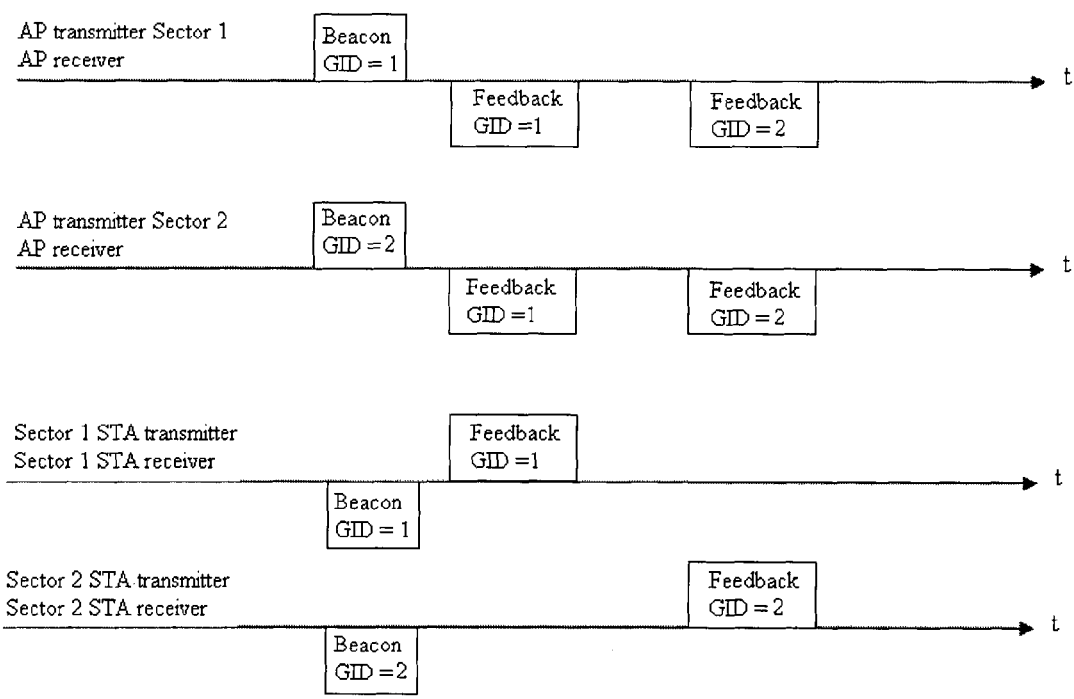
FIG. 29 shows an example of STA sector assignment by an AP with sectorized transmitting antenna (G=2) where ACKs to unicast frame are omitted, in accordance to various embodiments.

In cases where the AP operates in a mode that it only receives signals from one sector at one time, the AP may broadcast G beacons for G sectors simultaneously and the AP determines a STA's sector by evaluating the STA's feedback after the STA receives one of the G beacons. This operation is described as shown in FIG. 29, which only uses two-sector operation for illustration. In practice, the AP may operate G sectors simultaneously and transmit different signals to the G sectors simultaneously.

FIG. 29 shows that the AP broadcasts different beacons to each sector. The beacons for G sectors are transmitted simultaneously (or within small delay such that the signals would be overlapped if using omni-directional antennas). The beacon to each sector contains some form of signature like the sector ID (or GID as denoted in FIG. 29). The STA transmits feedback signal to the AP with the sector ID received. When more than one beacon are received, the STA determines its sector (e.g., by choosing the beacon with the strongest received signal) and feedbacks the sector ID to the AP. The feedback may be conveyed in the Association Request frame, or other uplink frames.

In FIG. 29, the AP transmits beacon with GID=1 to sector 1, and beacon with GID=2 to sector 2. The STA feedbacks the GID contained in the strongest beacon received. The STAs may either transmit feedback simultaneously (as shown in FIG. 29) or consecutively scheduled by the AP or based on the CSMA mechanism.

The assignment of AID is such that the STAs well-separated in the angular domain share the same AID. For example, if G=3 and the AID ranges from 1 to 2000, 3×2000=6000 STA may be addressed simultaneously.

The data streams or control signals from AP to STA for the A (A antennas may be designed such that the received signal at each STA is the same as the intended signal transmitted by a single antenna.

One example achieving this is shown in Eqn (6) below:

$$Tx=y \quad (6)$$

where T is the G×A beamforming matrix, x is a A×1 vector corresponding to the transmitted signal, and y is the intended signal vector at the three sectors.

The beamforming matrix T is designed such that data streams/three beacons/TIMs for the three sectors may transmitted simultaneously and the STAs within each sector only receives its corresponding TIM.

Operation Examples

Figure 30:
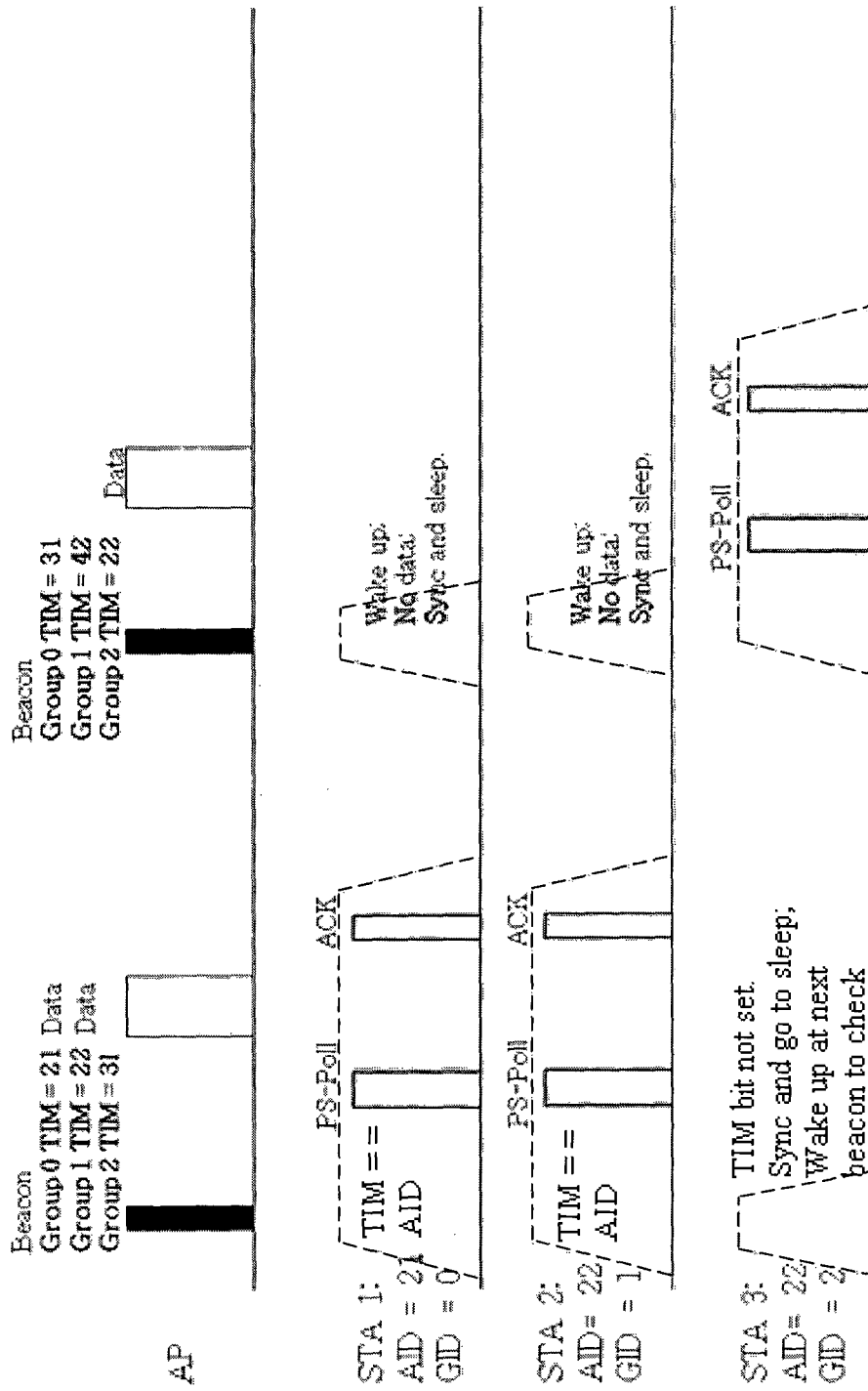
FIG. 30 shows a schematic diagram illustrating PS-Poll process with multi-antenna based addressing method, in accordance to various embodiments.

An example of the operation with beacon transmission is shown in FIG. 30. In FIG. 30, STAs have already been allocated with groups as described above. Beacons are transmitted using omnidirectional antennas, i.e., without using sectorized antennas.

In the first beacon, the $21^{st}$ STA in group 0 (or sector 0) is paged in the TIM, and the $22^{nd}$ STA in group 1 (sector 1) is paged. No STA in group 2 is paged, e.g., a concerned 31st STA is not paged for illustration in FIG. 30. Hence the STA with AID 21 in group 0 (STA 1 in FIG. 30) and the STA with AID 22 in group 1 (STA 2 in FIG. 30) know that they are paged after receiving the beacon and send PS-Polls to the AP. The AP designs the downlink data streams such that each STA receives its respective data.

In the second beacon, STA 1 and STA 2 are not addressed. Hence they go to PS mode. Only STA 3 who is paged sends the PS-Poll to poll downlink data from the AP.

Figure 31:
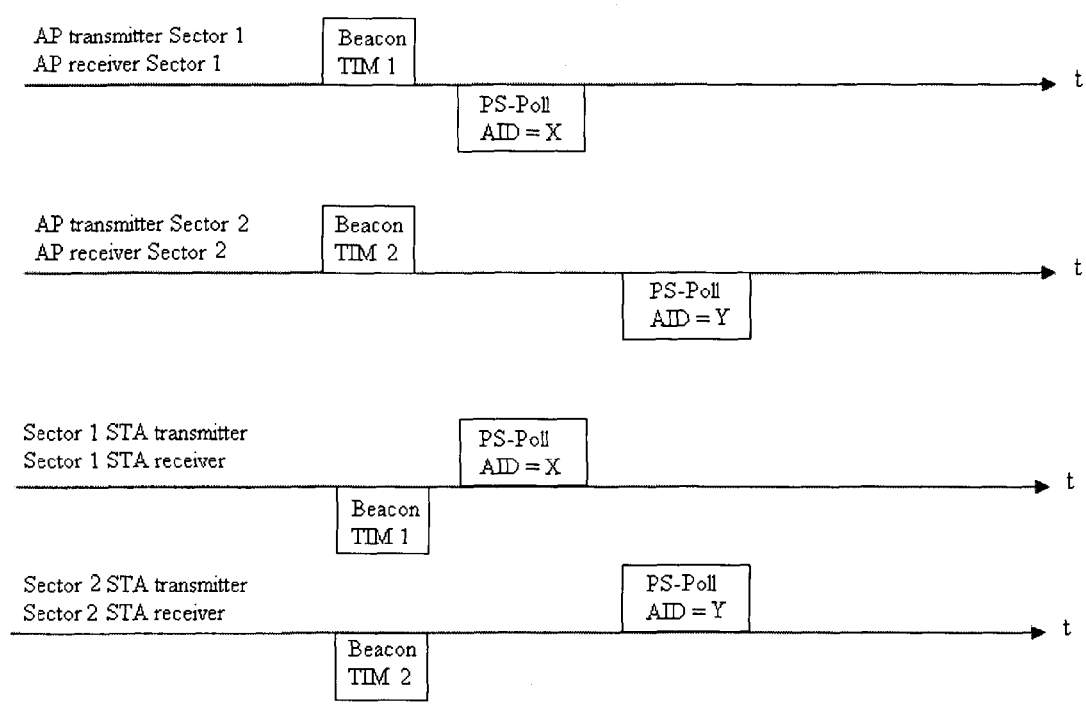
FIG. 31 shows an example of PS-Poll with sector specific beacon where ACKs to unicast frame are omitted, in accordance to various embodiments.

Another example of the operation of PS-Poll is shown in FIG. 31, where the AP transmits sector-specific beacon that contains the TIM for STAs within the same sector. For the two sector (G=2) operation, the AP transmits a beacon with sector specific TIM (TIM 1 and TIM 2 for sector 1 and sector 2, respectively). STAs in sector 1 receives TIM 1 and STAs in sector 2 receives TIM 2. Paged STAs (with AID X in sector 1 and AID Y in sector 2) transmits PS-Poll to poll the downlink buffered data. Similar to FIG. 29, the STAs may either transmit PS-Poll simultaneously (not shown in FIG. 31) or consecutively (as shown in FIG. 31) scheduled by the AP or based on the CSMA contention based mechanism.

Figure 32:
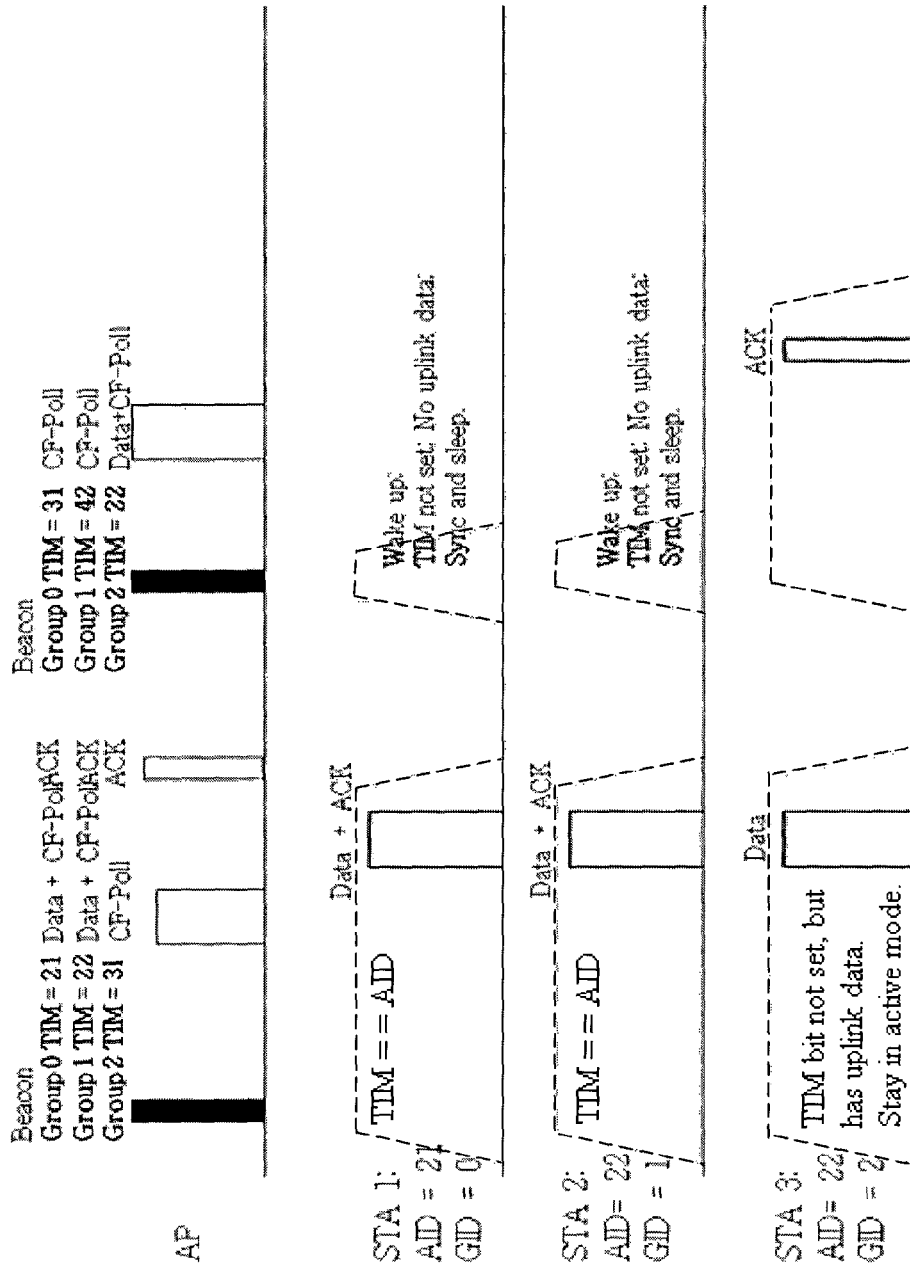
FIG. 32 shows a schematic diagram illustrating PCF operation with multi-antenna based addressing method, in accordance to various embodiments.

An example of the operation of PCF is shown in FIG. 32.

In the first beacon, the AP has buffered data for STA 1 and STA 2. Hence both STAs stay active and wait for the AP to deliver the data. Although the AP does not buffer any data for STA 3, STA 3 has uplink data for the AP, so it also stays in active mode and waits for the AP to poll its data. The operation of each sector of STAs is independent of the other sectors.

In the second beacon, as STA 1 and STA 2 have no uplink data, nor their TIM bits are set, they synchronize and go to PS mode and do not respond to CF-Poll. STA 3's TIM bit is set. Hence it stays in active mode and wait for the AP to deliver the data.

The AP broadcasts the beacon where one or more additional (new) IEs need to be added to indicate GIDs. Only the STAs whose GIDs (GID_sta) are in the AP's broadcasted GIDs (GID_ap) are addressed by this beacon. If the AP's broadcasted GID is not within AP's broadcasted GIDs, the STA goes to PS mode. The assignment of AIDs covered by each IE may be dynamic by introducing new TIM definitions or encoding schemes, for example, as described hereinabove. It should be appreciated that the additional (new) IEs do not necessarily need to follow the format of TIM IE in the current IEEE 802.11 specification, and may be made to be more efficient.

In the context of various embodiments, the term "about" or "approximately" as applied to a numeric value encompasses the exact value and a variance of +/−5% of the value.

The phrase "at least substantially" may include "exactly" and a variance of +/−5% thereof. As an example and not limitation, the phrase "A is at least substantially the same as B" may encompass embodiments where A is exactly the same as B, or where A may be within a variance of +/−5%, for example of a value, of B, or vice versa.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device of a wireless communication network, the communication device comprising:
   a memory; and
   a processor coupled with the memory, wherein the processor
      generates a beacon message having a traffic indication map (TIM) information element (IE), wherein the TIM IE comprises a partial virtual bitmap field comprising at least one cluster, and a bitmap control field indicating the number of clusters in the partial virtual bitmap field, determines for the at least one cluster information indicating whether data is available in the communication device to be transmitted to a plurality of communication terminals of the wireless communication network, determines an encoding mode for the information depending on the information and to encode the information based on the encoding mode, wherein the at least one cluster comprises the encoded information and indicates the encoding mode; and a transmitter, coupled with the processor, configured to broadcast the beacon message to the plurality of communication terminals corresponding to the at least one cluster wherein the encoded information comprises a first bitmap, a first control field for the first bitmap, and information about the group corresponding to a group identity (GID), and wherein the encoded information comprises:
a first part indicative of a number of groups (G) of communication terminals of the wireless communication network; and
a second part including G segments, each segment comprising a second bitmap and a second control field for the second bitmap; and being associated to the GID,
wherein the information about the group corresponds to the first part and the second control field of the second part; and wherein the first bitmap corresponds to the second bitmap of the second part.

2. The communication device of claim 1, wherein the processor determines the encoding mode based on the number of bits in the information that is set, or a distribution of the bits in the information that is set, or the number of communication terminals that the communication device intends to address, or the complexity level of decoding the encoding mode, or any combination thereof.

3. The communication device of claim 1, further comprising a plurality of association identities (AIDs), by each of which a communication terminal of the plurality of communication terminals is identified.

4. The communication device of claim 1, further comprising a grouping determiner configured to divide the plurality of communication terminals of the wireless communication network into groups.

5. The communication device of claim 1, wherein for the segment of the second part, the second control field comprises an offset value for the second bitmap.

6. The communication device of claim 1, wherein the GID is determined based on a mathematical formulation of an association identity (AID) of a communication terminal of a group from the groups of communication terminals and the number of communication terminals (N) in the group, as given by Modulus(AID of the communication terminal/$N$).

7. The communication device of claim 1, wherein the GID is determined based on a mathematical function of a Time Synchronization Function (TSF) of a communication terminal of a group from the groups of communication terminals, a beacon interval (BI) of the beacon message, and the number of groups (G) of communication terminals, as given by Remainder(Modulus(TSF,BI)/$G$).

8. The communication device of claim 1, wherein the second bitmap is inversely coded depending on the second control field.

9. The communication device of claim 1, wherein the first bitmap is inversely coded depending on the first control field.

10. The communication device of claim 9, wherein the first control field or the second control field further comprises a sign bit configured to set to a first state indicating that the first bitmap or the second bitmap is coded or to a second state indicating that the first bitmap or the second bitmap is inversely coded, the first state being different from the second state.

11. A communication device of a wireless communication network, the communication device comprising:
a memory;
a processor coupled with the memory, wherein the processor
generates a beacon message having a traffic indication map (TIM) information element (IE), wherein the TIM IE comprises a partial virtual bitmap field comprising at least one cluster, and a bitmap control field indicating the number of clusters in the partial virtual bitmap field,
determines for the at least one cluster information indicating whether data is available in the communication device to be transmitted to a plurality of communication terminals of the wireless communication network,
determines an encoding mode for the information depending on the information and to encode the information based on the encoding mode, wherein the at least one cluster comprises the encoded information and indicates the encoding mode; and
a transmitter configured to broadcast the beacon message to the plurality of communication terminals corresponding to the at least one cluster,
wherein the encoded information comprises a first bitmap, a first control field for the first bitmap, and information about the group corresponding to a group identity (GID), and
wherein the information about the group comprises:
a part indicative of a number of groups (G) of communication devices of the wireless communication network, and
a group indicator map (GIM) field with G bits, each of the G bits corresponding to
a group of communication terminals from the groups of communication terminals; and
wherein the first bitmap is arranged to be decoded by the group of communication terminals depending on a state of the corresponding bit in the GIM field.

12. A communication terminal of a wireless communication network, the communication terminal comprising:
a receiver configured to receive from a communication device of the wireless communication network a beacon message having a traffic indication map (TIM) information element (IE), wherein the TIM IE comprises a partial virtual bitmap field comprising at least one cluster, and a bitmap control field indicating the number of clusters in the partial virtual bitmap field, and wherein the at least one cluster comprises an encoded information and indicates an encoding mode;
a processor coupled with the receiver, wherein the processor
decodes the encoded information based on the encoding mode, and determines based on the information whether the communication terminal is to retrieve data from the communication device,
   wherein the beacon message is for a group of communication terminals; and wherein the communication terminal is part of the group,
wherein the decoded information comprises a first bitmap; and information about the group corresponding to a group identity (GID),
wherein the decoded information comprises:
   a first part indicative of a number of groups (G) of communication terminals of the wireless communication network; and
   a second part including G segments, each segment comprising a second bitmap and a second control field for the second bitmap; and being associated to the GID,
   wherein the information about the group corresponds to the first part and the second control field of the second part, and wherein the first bitmap corresponds to the second bitmap of the second part.

13. The communication terminal of claim 12, wherein the processor determines that the communication terminal is to retrieve the buffered data from the communication device if the GID and an association identity (AID) of the communication terminal respectively match the GID and a bitmap address of the segment; or determines that the communication terminal is to be in the power saving mode if at least one of the GID and the AID of the communication terminal fails to match the GID and any bitmap address of the segment respectively.

14. A method of simultaneously addressing a plurality of communication terminals of a wireless communication network, the method comprising:
   generating a beacon message having a traffic indication map (TIM) information element (IE), wherein the TIM IE comprises a partial virtual bitmap field comprising at least one cluster, and a bitmap control field indicating the number of clusters in the partial virtual bitmap field;
   determining for the at least one cluster information indicating whether data is available in a communication device to be transmitted to the plurality of communication terminals of the wireless communication network;
   determining an encoding mode for the information depending on the information and encoding the information based on the encoding mode, wherein the at least one cluster comprises the encoded information and indicates the encoding mode; and
   broadcasting the beacon message to the plurality of communication terminals corresponding to the at least one cluster,
   wherein the encoded information comprises a first bitmap, a first control field for the first bitmap, and information about the group corresponding to a group identity (GID), and
   wherein the encoded information comprises:
      a first part indicative of a number of groups (G) of communication terminals of the wireless communication network; and
      a second part including G segments, each segment comprising a second bitmap and a second control field for the second bitmap; and being associated to the group identity (GID),
      wherein the information about the group corresponds to the first part and the second control field of the second part; and wherein the first bitmap corresponds to the second bitmap of the second part.

15. The method of claim 14, further comprising:
receiving from the communication device of the wireless communication network the beacon message having the TIM IE;
decoding the encoded information based on the encoding mode;
determining based on the information whether the communication terminal is to retrieve data from the communication device,
   wherein the beacon message is for a group of communication terminals of the plurality of communication terminals; and wherein the communication terminal is part of the group.

* * * * *